US008106915B2

(12) United States Patent
Kawano et al.

(10) Patent No.: US 8,106,915 B2
(45) Date of Patent: Jan. 31, 2012

(54) DISPLAY CONTROL CIRCUIT AND DISPLAY DEVICE

(75) Inventors: Shintarou Kawano, Tokyo (JP); Kazutoshi Tanimoto, Tokyo (JP); Hiroaki Morimoto, Tokyo (JP)

(73) Assignee: Fujitsu Semiconductor Limited, Yokohama (JP)

( * ) Notice: Subject to any disclaimer, the term of this patent is extended or adjusted under 35 U.S.C. 154(b) by 894 days.

(21) Appl. No.: 12/119,072

(22) Filed: May 12, 2008

(65) Prior Publication Data

US 2008/0313377 A1 Dec. 18, 2008

(30) Foreign Application Priority Data

Jun. 15, 2007 (JP) ................................. 2007-158925

(51) Int. Cl.

| | |
|---|---|
| ***G06F 13/18*** | (2006.01) |
| ***G06F 12/00*** | (2006.01) |
| ***G06F 13/14*** | (2006.01) |
| ***G06F 13/00*** | (2006.01) |
| ***G09G 5/39*** | (2006.01) |

(52) U.S. Cl. ........ 345/535; 345/531; 345/534; 710/240; 710/244; 711/158; 711/168

(58) Field of Classification Search ........................ None
See application file for complete search history.

(56) References Cited

U.S. PATENT DOCUMENTS

| | | | | |
|---|---|---|---|---|
| 6,681,285 | B1 * | 1/2004 | Ng | 710/309 |
| 2006/0022985 | A1 * | 2/2006 | Shepherd et al. | 345/535 |
| 2006/0082586 | A1 * | 4/2006 | Noorbakhsh et al. | 345/535 |
| 2007/0136545 | A1 * | 6/2007 | Kommrusch et al. | 711/169 |

FOREIGN PATENT DOCUMENTS

| | | |
|---|---|---|
| JP | 2006-126829 A | 5/2006 |

* cited by examiner

*Primary Examiner* — Xiao M. Wu
*Assistant Examiner* — Tize Ma
(74) *Attorney, Agent, or Firm* — Fujitsu Patent Center

(57) ABSTRACT

A display control circuit capable of performing arbitration with the use of a simple configuration. The display control circuit exchanges, with a plurality of masters, attribute information defining conditions for displaying video on a display, and includes a memory for storing the attribute information, a plurality of channels associated with the respective masters for accepting, from the masters, access requests to access the memory, and an arbitration controller configured by hardware. The arbitration controller arbitrates the access requests accepted via the respective channels and permits a selected one of the access requests to access the memory.

9 Claims, 29 Drawing Sheets

DISPLAY CONTROL CIRCUIT AND DISPLAY DEVICE

CROSS-REFERENCE TO RELATED APPLICATIONS

This application is based upon and claims the benefits of priority from the prior Japanese Patent Application No. 2007-158925, filed on Jun. 15, 2007, the entire contents of which are incorporated herein by reference.

BACKGROUND

1. Field

The present embodiment relates to display control circuits and display devices. For example, the embodiment relates to a display control circuit and a display device for exchanging, with a plurality of masters, attribute information defining conditions for displaying video on a display.

2. Description of the Related Art

Methods have been conventionally known whereby attribute information or the like of a video display device (e.g., PC monitor or DTV) is exchanged between the video display device and a plurality of video output devices (e.g., DVD player, graphics card, etc.) via a DDC (Display Data Channel (I2C bus)) at their interface.

For example, when an identical slave (device addressed by masters) is accessed by multiple I2C single masters (devices that initiate data transfer, generate a clock signal, and terminate the data transfer), mastership over the bus is arbitrated (only one master is permitted to control the bus) in accordance with the connection configurations of the masters, to determine a master that is allowed to access the slave.

Generally, a video display device is equipped with a plurality of different video input connectors (HDMI (High-Definition Multimedia Interface), DVI (Digital Visual Interface), VGA (Video Graphics Array), etc.). Thus, to enable video output devices to acquire the attribute information on the video display device regardless of the connector type, the interfaces are defined by the Vesa DDC standard and the data contents are defined by EDID (Extended Display Identification Data), CEA (Consumer Electronics Association) 861, and HDMI.

However, since some of these standards do not allow for multi-master configuration, video display devices need to be designed taking account of a situation where masters with no arbitration function are connected.

FIG. 29 shows an exemplary configuration of a conventional display control circuit.

Where a display control circuit 90 is equipped with three channels of HDMI connectors 90*a* to 90*c* and one channel of DVI connector 90*d*, as shown in FIG. 29, it is necessary to provide the circuit with four nonvolatile memories 91*a* to 91*d* storing almost the same data (attribute information; in practice, only the port number and the checksum may differ), making the circuit configuration redundant.

As a configuration for avoiding the inconvenience, a technique has been known wherein multiple I2C single masters are made to access a single slave via a CPU (see, e.g., Unexamined Japanese Patent Publication No. 2006-126829).

The use of a CPU, on the one hand, makes it possible to reduce the number of memories but, on the other hand, leads to complexity of circuitry and also gives rise to a problem that costs cannot be substantially cut down.

SUMMARY

It is an aspect of the embodiments discussed herein to provide a display control circuit for exchanging, with a plurality of masters, attribute information defining conditions for displaying video on a display, including: an arbitration controller configured by hardware, the arbitration controller arbitrating a access requests accepted via the respective channels and permitting a selected one of the access requests to access the memory.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
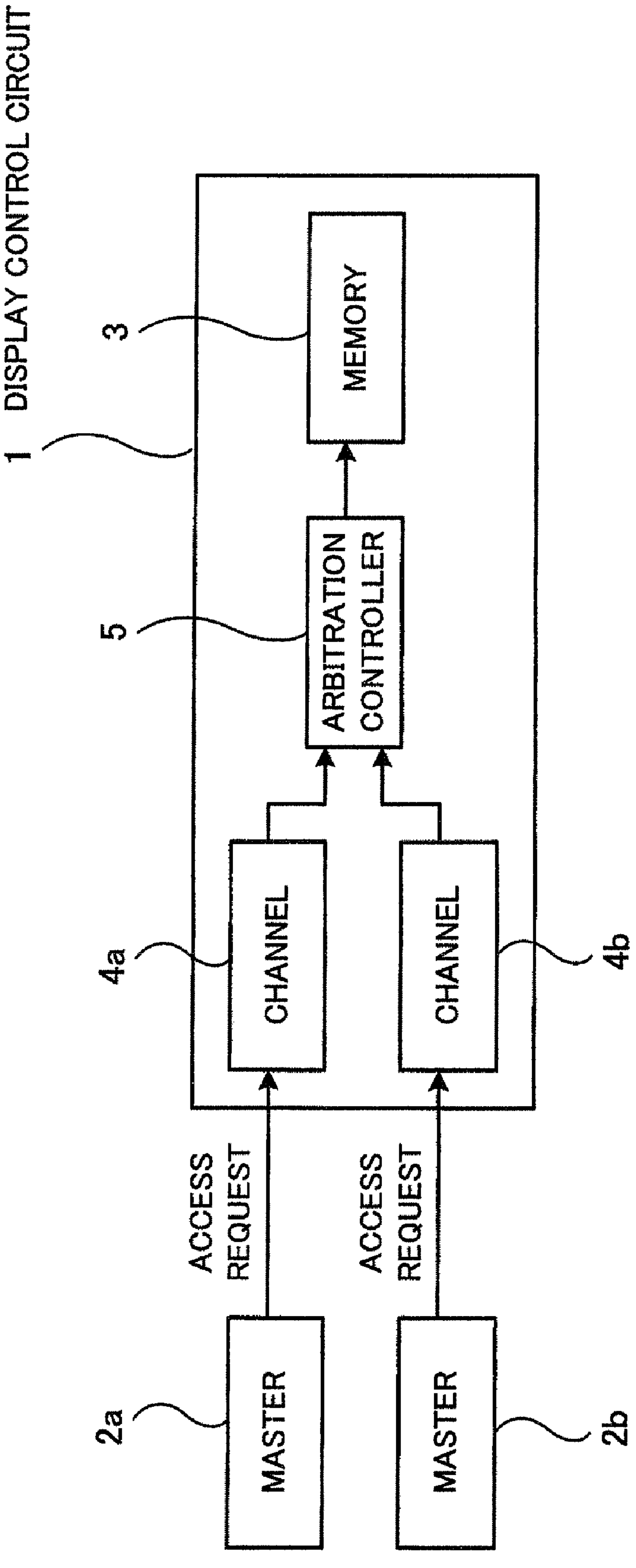
FIG. 1 schematically illustrates the present embodiment.

Preferred embodiments will be described in detail below with reference to the accompanying drawings, wherein like reference numerals refer to like elements throughout.

First, the present embodiment will be outlined, and then various embodiments will be described.

FIG. 1 schematically illustrates the present embodiment.

A display control circuit 1 shown in FIG. 1 is built in a display device and includes a memory 3, channels 4*a* and 4*b*, and an arbitration controller 5.

The memory 3 stores attribute information (e.g., maker's name, image size, refresh rate, and kinds of acceptable signals) defining conditions for displaying video on the display of the display device.

The channels 4*a* and 4*b* are provided in a manner associated with respective masters (in FIG. 1, masters 2*a* and 2*b*) and accept access requests to access the memory 3 (requests for the acquisition of the attribute information) from the respective masters 2*a* and 2*b* independently of each other.

The arbitration controller 5, which is configured by hardware, arbitrates the access requests accepted through the respective channels 4*a* and 4*b* and permits a selected one of the access requests to access the memory 3.

With the display control circuit 1, when access requests from the masters 2*a* and 2*b* are accepted through the respective channels 4*a* and 4*b*, the requests are arbitrated by the hardware-configured arbitration controller 5 and a selected one of the access requests is allowed to access the memory 3.

Embodiments will be now described.

Figure 2:
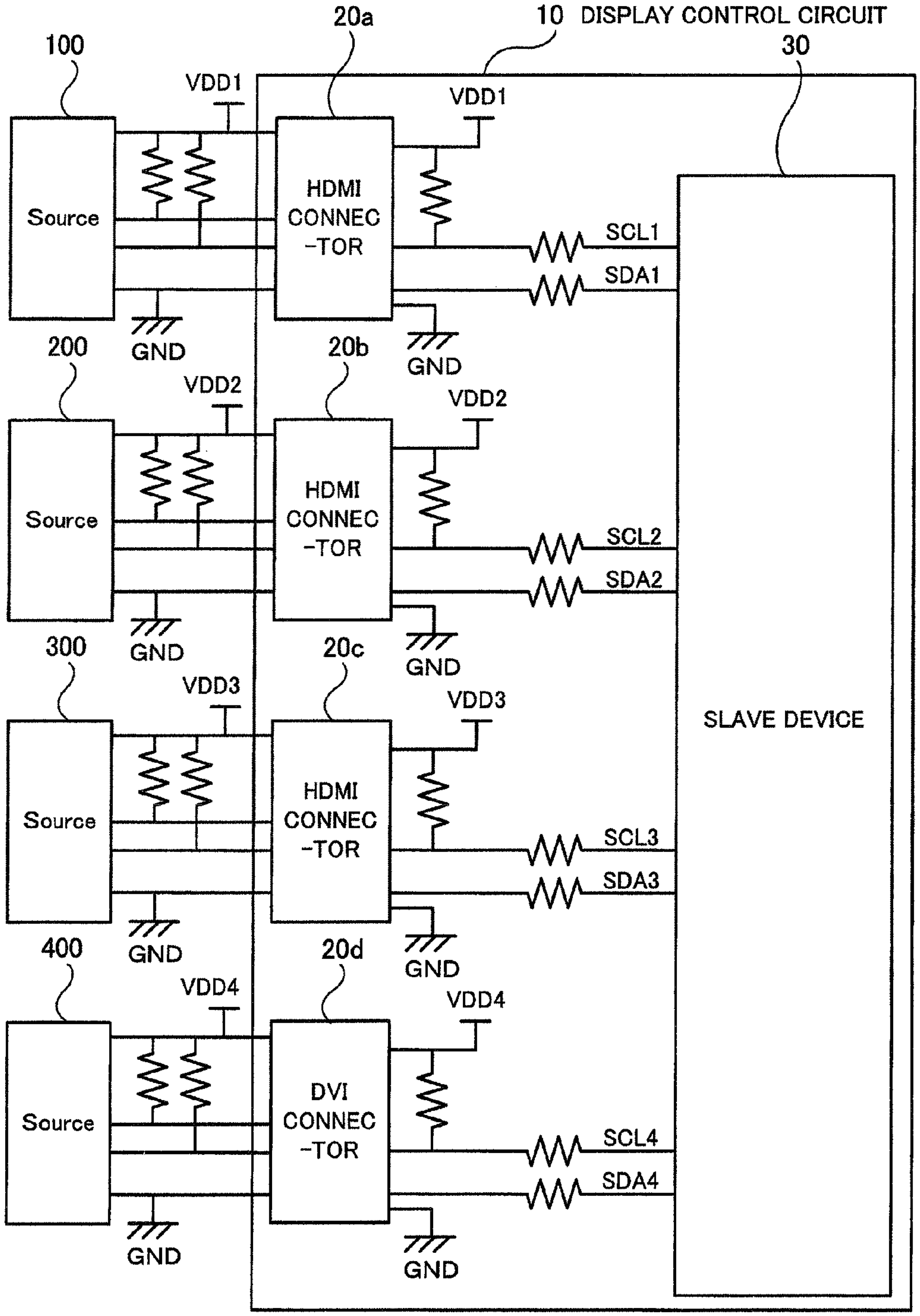
FIG. 2 is a circuit diagram of a display control circuit according to one embodiment.

FIG. 2 is a circuit diagram of a display control circuit according to one embodiment.

Sources 100, 200, 300 and 400 shown in FIG. 2 are access devices connected to the display control circuit 10 and each comprising an independent I2C single master such as a DVD.

The display control circuit 10 is provided within a video display device (display device) and constitutes an interface circuit for the multiple (in FIG. 2, four) sources 100, 200, 300 and 400 connected to the video display device.

The display control circuit 10 is conformable to the DDC standard and includes video input connectors for receiving video outputs and access request signals (hereinafter merely referred to as access requests) from the respective sources 100, 200, 300 and 400. In FIG. 2, the display control circuit 10 has HDMI connectors 20*a* to 20*c* and a DVI connector 20*d*, by way of example.

A slave device 30 arbitrates the access requests input from the respective sources 100, 200, 300 and 400 via the HDMI connectors 20*a* to 20*c* and the DVI connector 20*d* to select a single source, and performs I2C communication with the selected source.

Signals required for the I2C communication are two, namely, asynchronous line clock (SCLn (n=1, . . . , 4)) and line data (SDAn). At individual nodes, the two signals are each provided through a wired-OR connection using an open collector. Also, each line is pulled up at opposite ends to voltage VDDn (e.g., 5 V).

At the time of transmission, the sources 100, 200, 300 and 400 each output a data signal and a clock signal. The data and clock signals output from the sources 100, 200, 300 and 400 are input through the HDMI connectors 20*a* to 20*c* and the DVI connector 20*d*, respectively, to the slave device 30.

Also, when receiving data from the slave device 30, the sources 100, 200, 300 and 400 individually output the clock signal.

Figure 3:
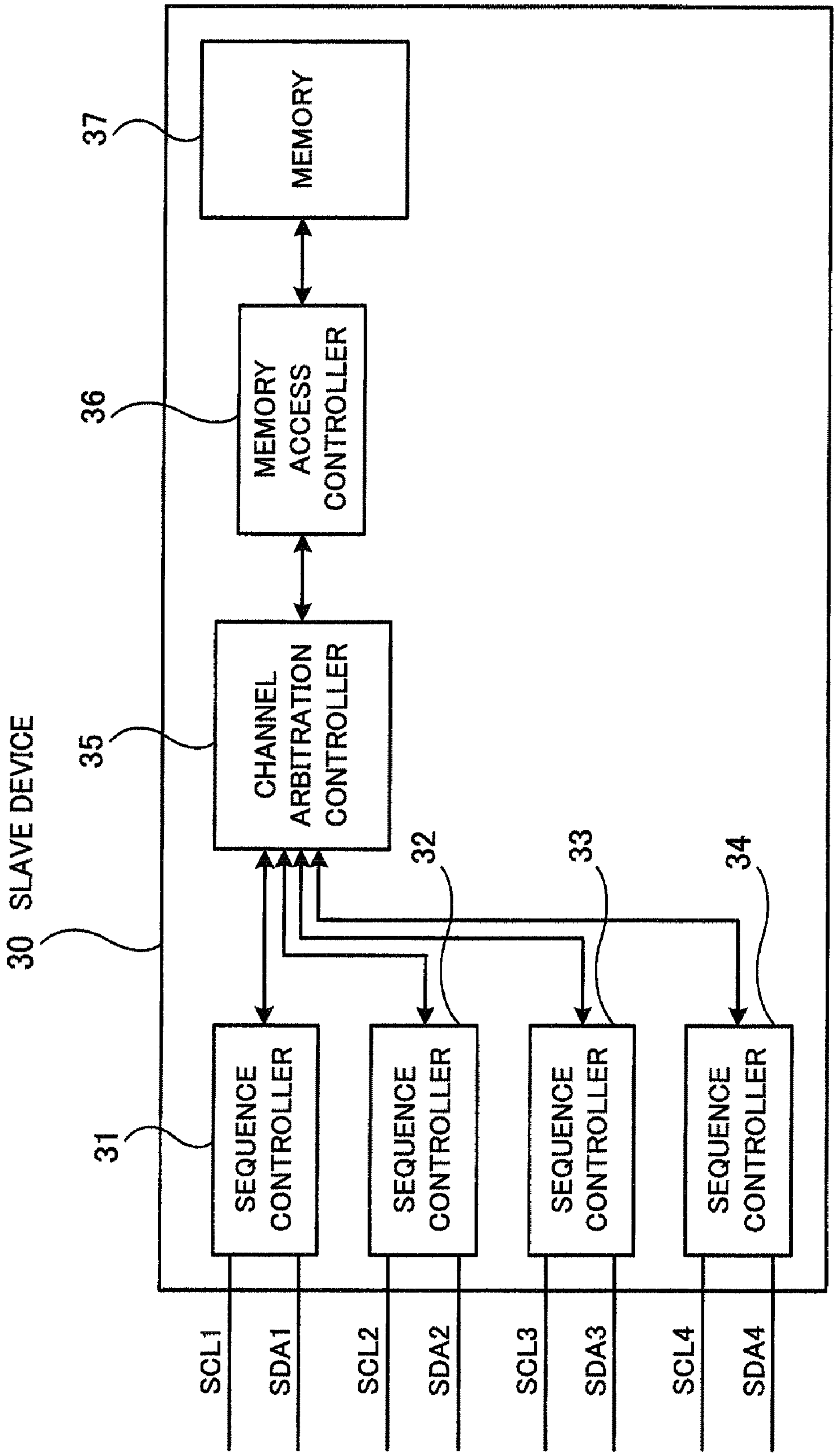
FIG. 3 is a block diagram of a slave device of the embodiment.

FIG. 3 is a block diagram of the slave device of this embodiment.

The slave device 30 is a single I2C slave device with no CPU (Central Processing Unit) and comprises sequence controllers 31 to 34, a channel arbitration controller 35, a memory access controller 36, and a memory 37.

The sequence controllers 31 to 34 are associated respectively with the HDMI connectors 20*a* to 20*c* and the DVI connector 20*d*.

Priorities (priority levels) are set for the respective sequence controllers 31 to 34, and the priority level of an input signal is determined by the sequence controller to which the signal has been input. In FIG. 3, the priority levels of the sequence controllers lower from the top downward. Namely, the signal input to the sequence controller 31 is highest in priority, and the signal input to the sequence controller 34 is lowest in priority.

The channel arbitration controller 35 arbitrates the access requests and permits a single source to access the memory 37.

Responsive to the access request from the source that is permitted to access the memory 37 by the channel arbitration controller 35, the memory access controller 36 acquires attribute information (hereinafter merely referred to as data) from the memory 37 and sends the acquired data to the source through the channel arbitration controller 35 and the corresponding sequence controller and connector.

The memory 37 is an EDID memory with an I2C interface, for example, and stores data prepared beforehand for sources.

Figure 4:
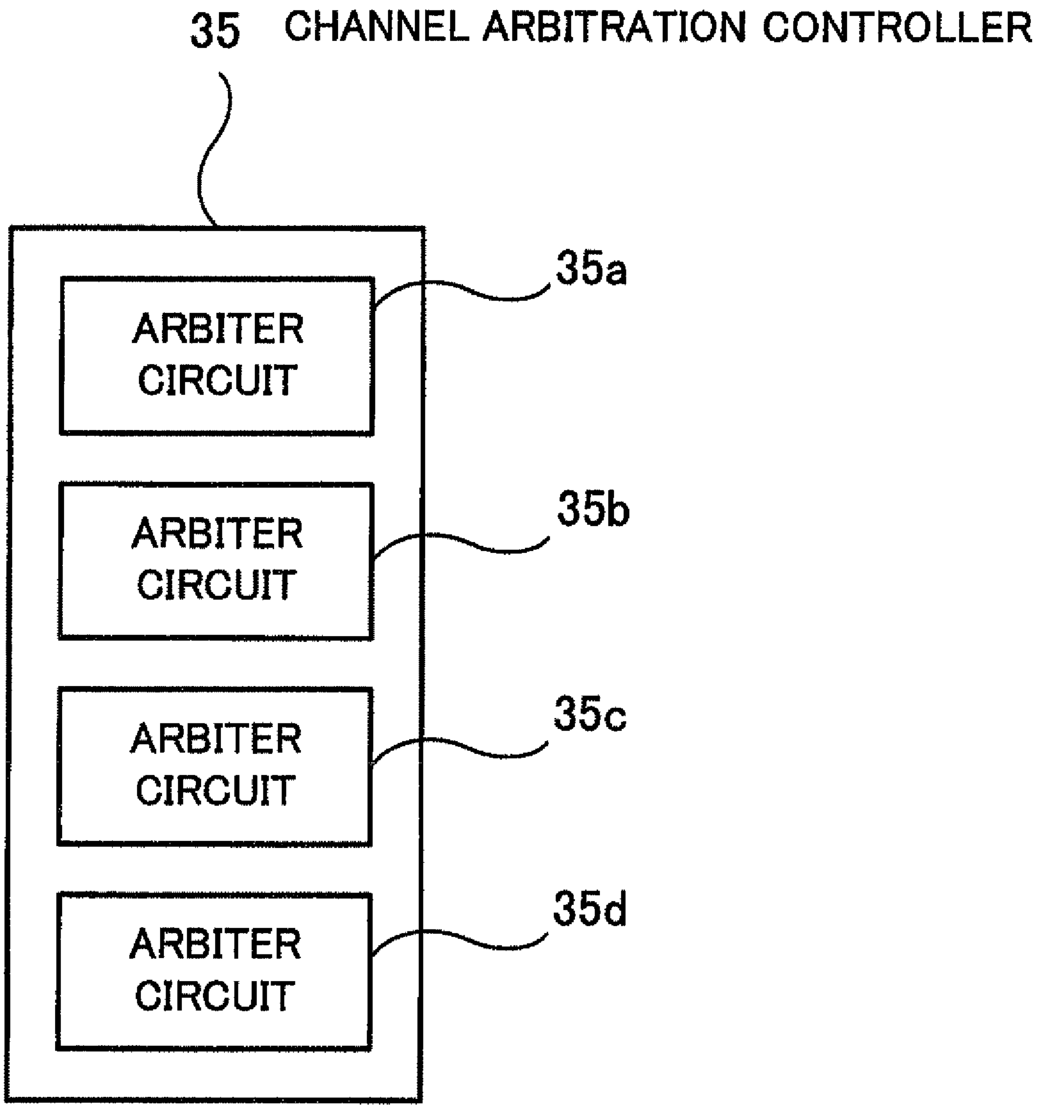
FIG. 4 is a block diagram of a channel arbitration controller.

FIG. 4 is a block diagram of the channel arbitration controller.

The channel arbitration controller 35 includes arbiter circuits 35*a* to 35*d* associated with the respective sequence controllers 31 to 34.

In accordance with the priority levels of the access requests received from the sequence controllers 31 to 34, the arbiter circuits 35*a* to 35*d* arbitrate the access of the requests to the memory 37. That is, where access requests are input to the respective arbiter circuits 35*a* to 35*d*, the arbiter circuits 35*a* to 35*d* cooperatively arbitrate the requests and permit one access request to be output to the memory access controller 36.

In the following, the sequence controllers 31 to 34 are defined as channels ch1 to ch4, respectively, and the request for access to the memory 37 input through the sequence controller 31, for example, is referred to as "ch1 access request" for ease of understanding.

Figure 5:
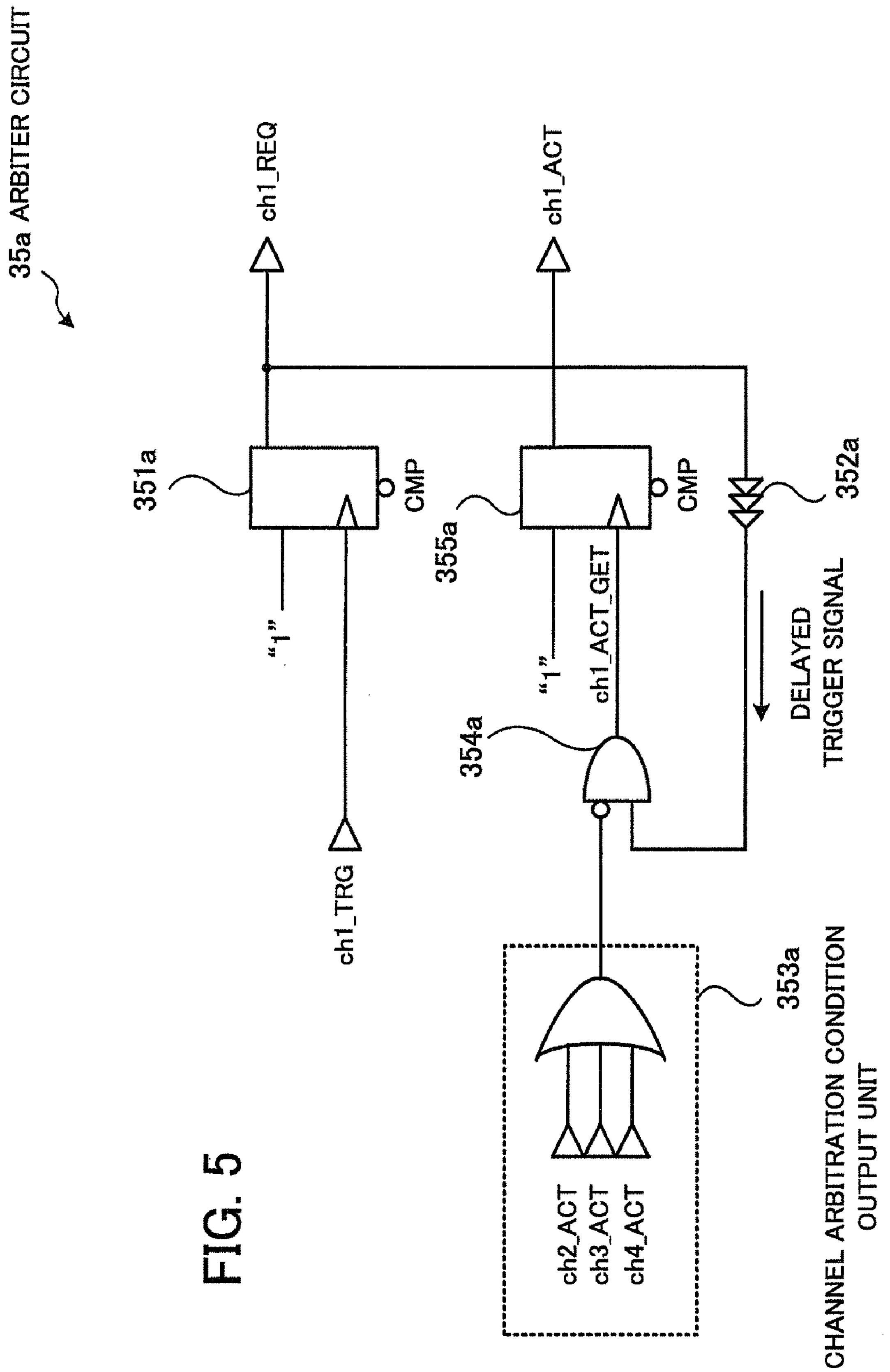
FIG. 5 is a circuit diagram of an arbiter circuit

FIG. 5 is a circuit diagram of the arbiter circuit 35*a* as a representative example.

The arbiter circuit 35*a* includes D-FFs 351*a* and 355*a*, a delay circuit 352*a*, a channel arbitration condition output unit 353*a*, and an AND gate 354*a*.

The D-FF 351*a* is input with "1" at its D terminal.

When making an access request, the sources 100, 200, 300 and 400 output their line clock signal, and the D-FF 351*a* uses the clock signal as a trigger to determine the presence/absence of an access. Specifically, when a trigger signal ch1_TRG, which is a pulse extracted from the line clock signal SCL1, is input to the CK terminal of the D-FF 351*a*, the D-FF 351*a* outputs a request signal ch1_REQ demanding access to the memory 37.

The delay circuit 352*a* generates a delayed trigger signal for arbitration by delaying the request signal ch1_REQ for a predetermined time.

The channel arbitration condition output unit 353*a* is input with a memory access permission signal ch2_ACT if the channel ch2 is accessing the memory 37, a memory access permission signal ch3_ACT if the channel ch3 is accessing the memory 37, and a memory access permission signal ch4_ACT if the channel ch4 is accessing the memory 37.

If any one of the other channels is accessing the memory 37, that is, if any one of the memory access permission signals ch2_ACT to ch4_ACT is "1" (active), the channel arbitration condition output unit 353*a* outputs "1". The channel arbitration condition output unit 353*a* outputs "0" if none of the other channels is accessing the memory, that is, if none of the memory access permission signals ch2_ACT to ch4_ACT is active.

The AND gate 354*a* has one input terminal input with the delayed trigger signal and the other input terminal input with the inverted output of the channel arbitration condition output unit 353*a*.

The D-FF 355*a* is input with "1" at its D terminal and also input with the output of the AND gate 354*a* at its CK terminal.

The D-FFs 351*a* and 355*a* are initialized when a memory access completion signal CMP, which indicates completion of access to the memory 37, is input to their R terminal from the memory access controller 36.

Operation of the arbiter circuit 35*a* will be now described with reference to FIGS. 5 and 6.

Figure 6:
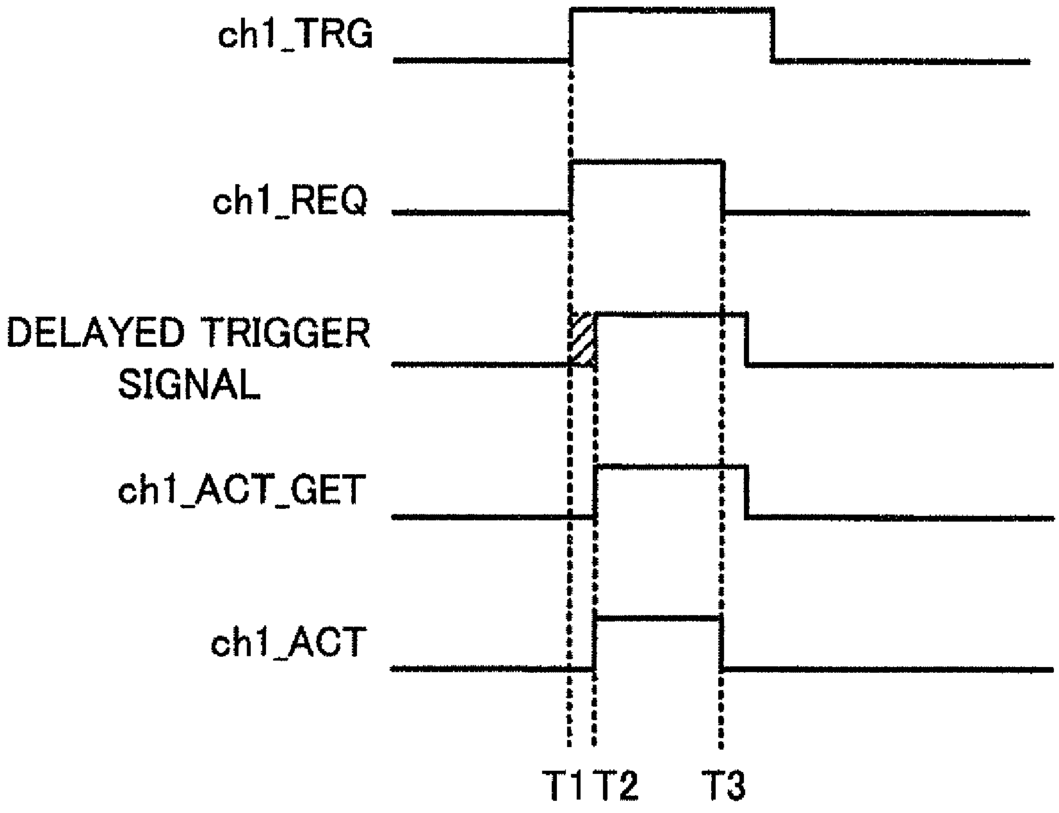
FIG. 6 illustrates the operation of the arbiter circuit.

FIG. 6 illustrates the operation of the arbiter circuit.

Using the line clock signal SCL1 from the sequence controller 31 to the memory 37 as a trigger, the D-FF 351*a* outputs a request signal ch1_REQ (time T1).

The delay circuit 352*a* receives the request signal ch1_REQ and generates a delayed trigger signal (time T2). The AND gate 354*a* obtains the AND of the delayed trigger signal and the output of the channel arbitration condition output unit 353*a*, thereby carrying out arbitration. Specifically, if none of the memory access permission signals ch2_ACT to ch4_ACT is "1", the AND gate 354*a* outputs an act condition fulfillment signal ch1_ACT_GET indicating acquisition of the access right (time T2).

When input with the act condition fulfillment signal ch1_ACT_GET, the D-FF 355*a* outputs a memory access permission signal ch1_ACT to the memory access controller 36 as well as to the other arbiter circuits 35*b* to 35*d*. This enables the channel ch1 to access the memory 37.

As soon as the access to the memory 37 is completed, a memory access completion signal CMP for initializing the logical states of the arbiter circuits 35*a* to 35*d* is input to the D-FFs 351*a* and 355*a* (time T3). Consequently, the logics of the D-FFs 351*a* and 355*a* are initialized.

Figure 7:
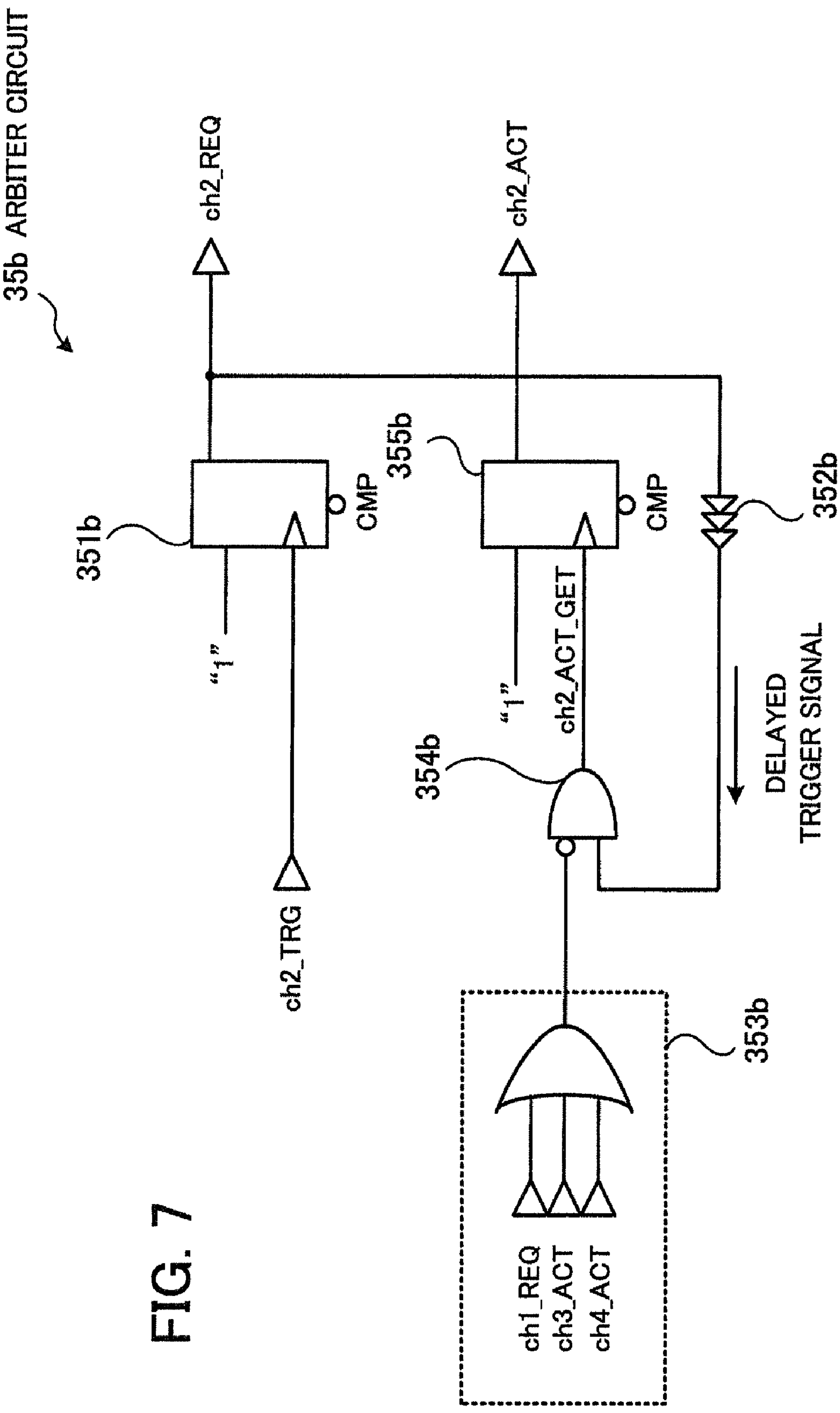
FIG. 7 shows the configuration of another arbiter circuit.

Configurations of the other arbiter circuits 35*b* to 35*d* will be now described with reference to FIGS. 7 to 9.

The arbiter circuits 35*b* to 35*d* each differ from the arbiter circuit 35*a* in the configuration of the channel arbitration condition output unit.

The arbiter circuit 35*b* includes D-FFs 351*b* and 355*b*, a delay circuit 352*b*, a channel arbitration condition output unit 353*b*, and an AND gate 354*b*.

The channel arbitration condition output unit 353*b* of the arbiter circuit 35*b* is input with the request signal ch1_REQ and the memory access permission signals ch3_ACT and ch4_ACT.

The channel arbitration condition output unit 353*b* outputs "1" if the arbiter circuit 35*a* is requesting access to the memory 37 or if the channel ch3 or ch4 is accessing the memory 37, and outputs "0" if none of the conditions is fulfilled. Specifically, "1" is output if the request signal ch1_REQ of the channel ch1, which is higher in priority than the local channel ch2, is not being output and also if neither of the memory access permission signals ch3_ACT and ch4_ACT of the lower-priority channels ch3 and ch4 is being output; otherwise, "0" is output.

Accordingly, when the arbiter circuit 35*a* is requesting access to the memory 37, the arbiter circuit 35*b* does not output a memory access permission signal ch2_ACT until the access to the memory 37 in compliance with the access request is completed. Similarly, when the arbiter circuit 35*c* or 35*d* is accessing the memory 37, the arbiter circuit 35*b* also does not output the memory access permission signal ch2_ACT until the memory access is completed.

Figure 8:
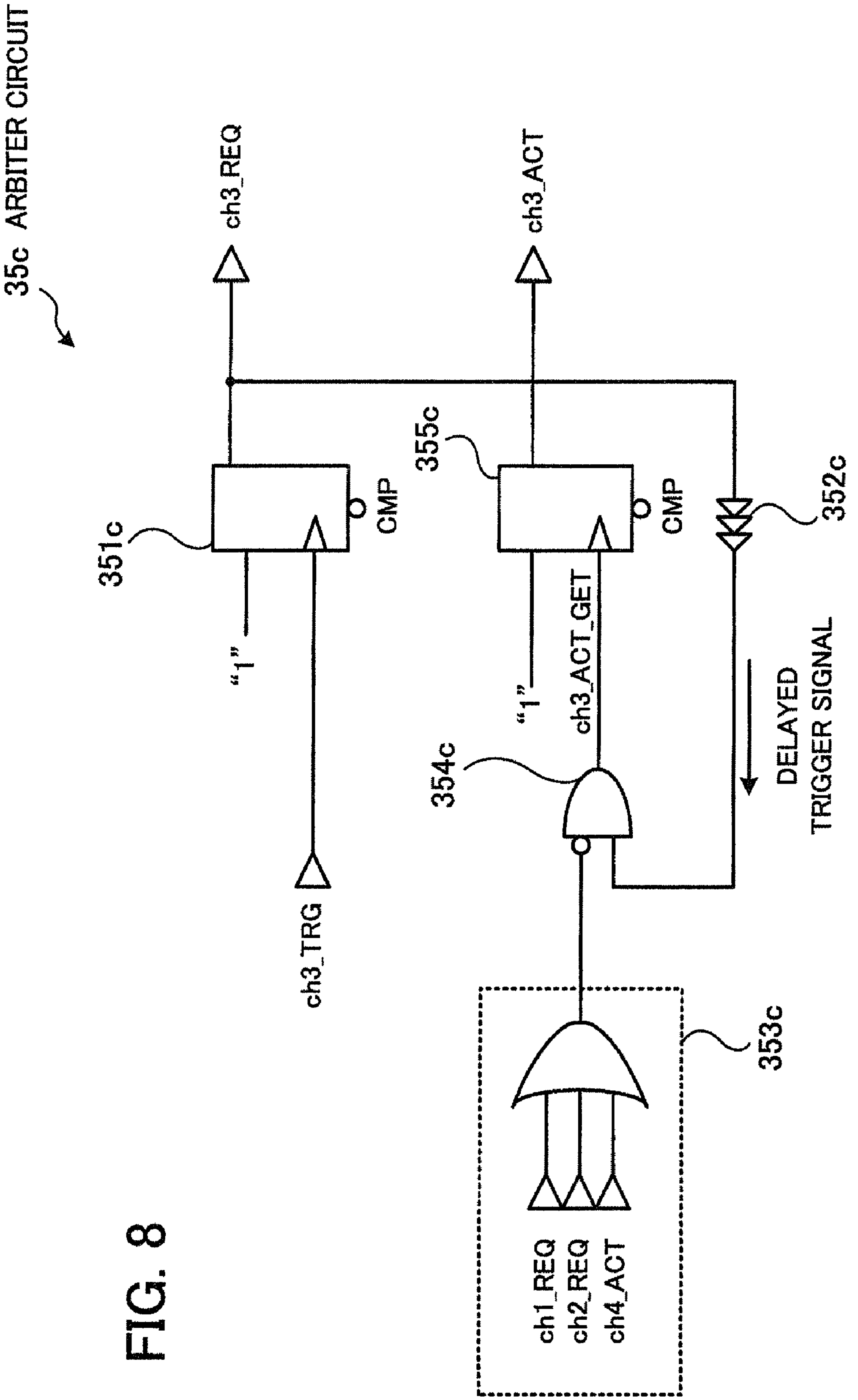
FIG. 8 shows the configuration of still another arbiter circuit.

The arbiter circuit 35*c* shown in FIG. 8 includes D-FFs 351*c* and 355*c*, a delay circuit 352*c*, a channel arbitration condition output unit 353*c*, and an AND gate 354*c*.

The channel arbitration condition output unit 353*c* is input with the request signals ch1_REQ and ch2_REQ and the memory access permission signal ch4_ACT.

The channel arbitration condition output unit 353*c* outputs "1" if the arbiter circuit 35*a* or 35*b* is requesting access to the memory 37 or if the channel ch4 is accessing the memory, and outputs "0" if none of the conditions is fulfilled. Specifically, "1" is output if neither of the request signals ch1_REQ and ch2_REQ of the channels ch1 and ch2, which are higher in priority than the local channel ch3, is being output and also if the memory access permission signal ch4_ACT of the lower-priority channel ch4 is not being output; otherwise, "0" is output.

Accordingly, when the arbiter circuit 35*a* or 35*b* is requesting access to the memory 37, the arbiter circuit 35*c* does not output a memory access permission signal ch3_ACT until the access to the memory 37 complying with the access request is completed. Similarly, when the arbiter circuit 35*d* is accessing the memory 37, the arbiter circuit 35*c* also does not output the memory access permission signal ch3_ACT until the access to the memory 37 is completed.

Figure 9:
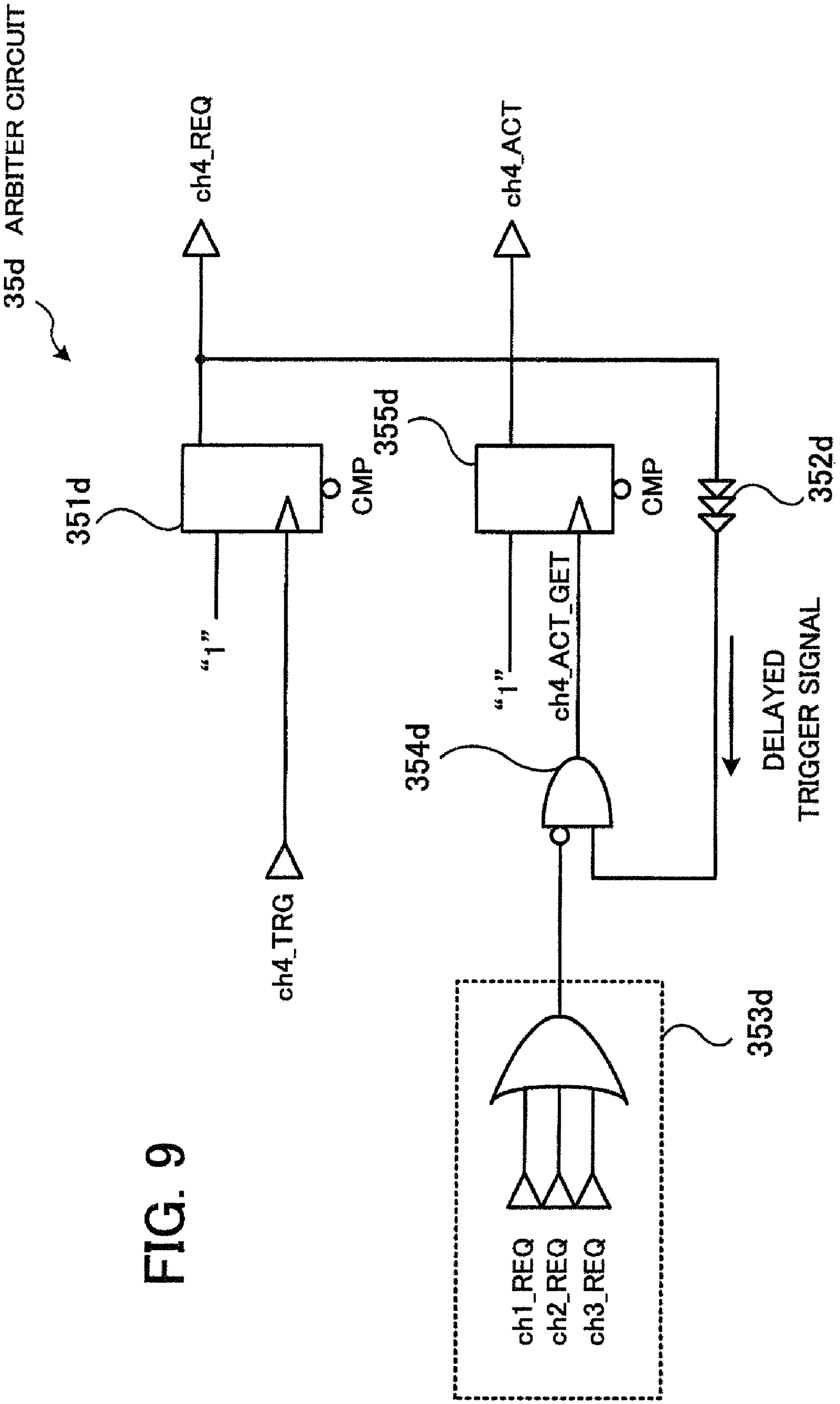
FIG. 9 shows the configuration of yet another arbiter circuit.

The arbiter circuit 35*d* shown in FIG. 9 includes D-FFs 351*d* and 355*d*, a delay circuit 352*d*, a channel arbitration condition output unit 353*d*, and an AND gate 354*d*.

The channel arbitration condition output unit 353*d* is input with the request signals ch1_REQ, ch2_REQ and ch3_REQ.

The channel arbitration condition output unit 353*d* outputs "1" if the arbiter circuit 35*a* or 35*b* or 35*c* is requesting access to the memory 37, and outputs "0" if none of the conditions is fulfilled. Specifically, "1" is output if none of the request signals ch1_REQ, ch2_REQ and ch3_REQ of the channels ch1, ch2 and ch3 higher in priority than the local channel ch4 is being output; otherwise, "0" is output.

Accordingly, when the arbiter circuit 35*a* or 35*b* or 35*c* is requesting access to the memory 37, the arbiter circuit 35*d* does not output a memory access permission signal ch4_ACT until the memory access is completed.

FIGS. 10 to 15 illustrate specific examples of how the arbiter circuits operate. In the figures, circled numerals indicate the channel numbers requesting access, and hatched portions indicate the time periods over which the memory access permission signal is output from a channel that first acquired the act condition fulfillment signal and from other channels. In the following description with reference to FIGS. 10 to 15, the states of the remaining unshown channels are not taken into consideration.

Figure 10:
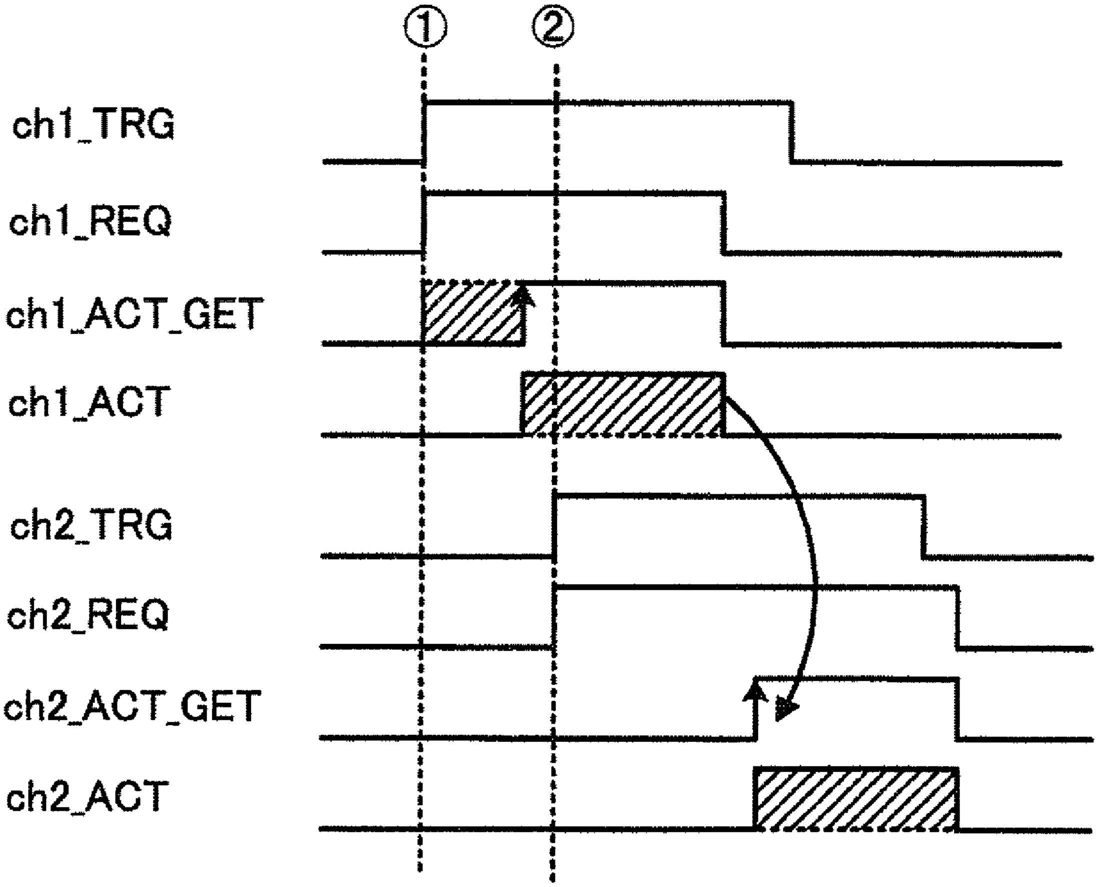
FIG. 10 shows a specific example of operation of the arbiter circuit.

FIG. 10 shows an exemplary case of arbitrating the channels ch1 and ch2, wherein the ch1 access request is significantly earlier than the ch2 access request.

When the delayed trigger signal is input to the AND gate 354*a* of the arbiter circuit 35*a*, the memory access permission signal ch2_ACT is "0". Accordingly, the channel ch1 acquires the access right and the arbiter circuit 35*a* outputs the memory access permission signal ch1_ACT, with the result that the channel ch1 accesses the memory 37. After the access of the channel ch1 is completed, the channel ch2 acquires the access right and the arbiter circuit 35*b* outputs the memory access permission signal ch2_ACT, so that the channel ch2 accesses the memory 37.

Figure 11:
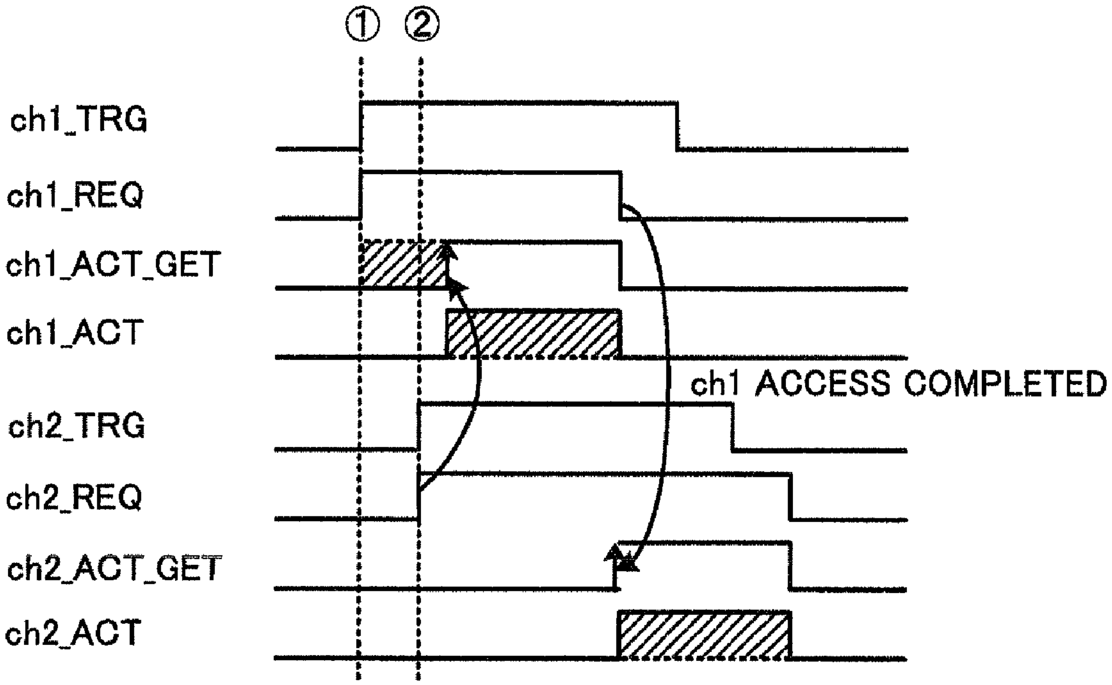
FIG. 11 shows another specific example of operation of the arbiter circuit.

FIG. 11 shows another exemplary case of arbitrating the channels ch1 and ch2, wherein the channel ch2 makes an access request after the channel ch1 requests access and before the channel ch1 starts accessing the memory.

When the delayed trigger signal is input to the AND gate 354*a* of the arbiter circuit 35*a*, the memory access permission signal ch2_ACT is "0". Accordingly, the channel ch1 acquires the access right, regardless of the state of the request signal ch2_REQ of the channel ch2, and the arbiter circuit 35*a* outputs the memory access permission signal ch1_ACT, so that the channel ch1 accesses the memory 37. On completion of the access of the channel ch1, the channel ch2 acquires the access right and the arbiter circuit 35*b* outputs the memory access permission signal ch2_ACT, whereupon the channel ch2 accesses the memory 37.

Figure 12:
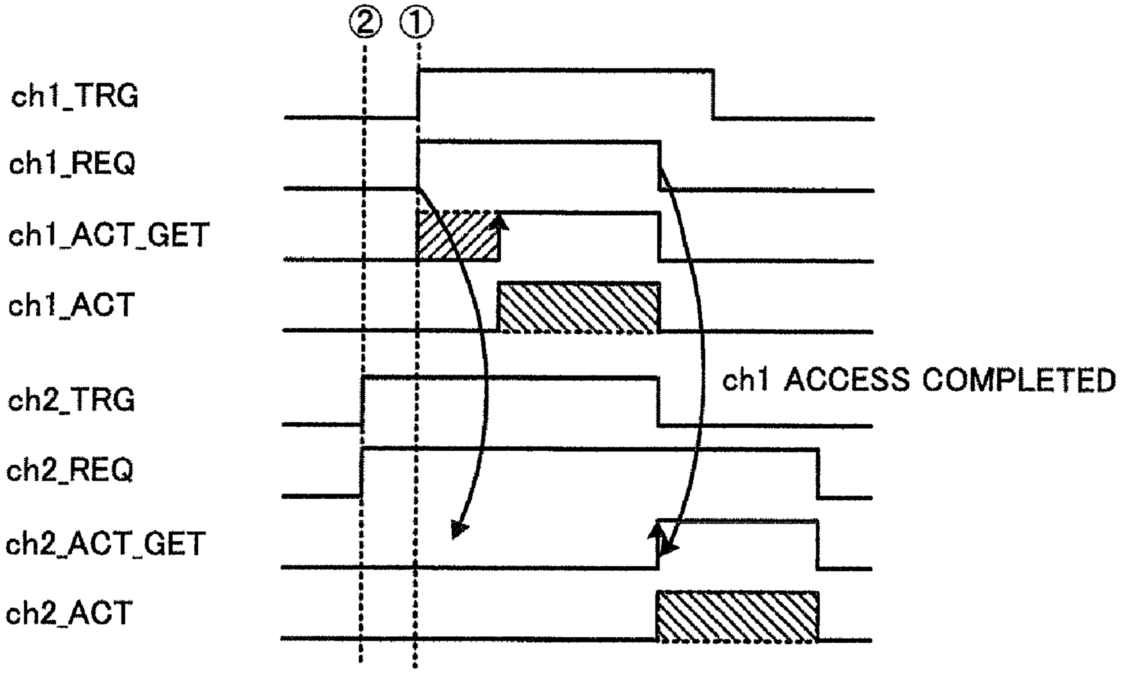
FIG. 12 shows still another specific example of operation of the arbiter circuit.

FIG. 12 shows still another exemplary case of arbitrating the channels ch1 and ch2, wherein the ch2 access request is earlier than the ch1 access request but the ch1 access request is made before the channel ch2 starts accessing the memory.

When the delayed trigger signal is input to the AND gate 354*b* of the arbiter circuit 35*b*, the request signal ch1_REQ is "1", and therefore, the memory access permission signal ch2_ACT remains at "0".

On the other hand, when the delayed trigger signal is input to the AND gate 354*a* of the arbiter circuit 35*a*, the memory access permission signal ch2_ACT is "0". Accordingly, the channel ch1 acquires the access right and the arbiter circuit 35*a* outputs the memory access permission signal ch1_ACT, with the result that the channel ch1 accesses the memory 37. After the access of the channel ch1 is completed, the channel ch2 acquires the access right and the arbiter circuit 35*b* outputs the memory access permission signal ch2_ACT, so that the channel ch2 accesses the memory 37.

Figure 13:
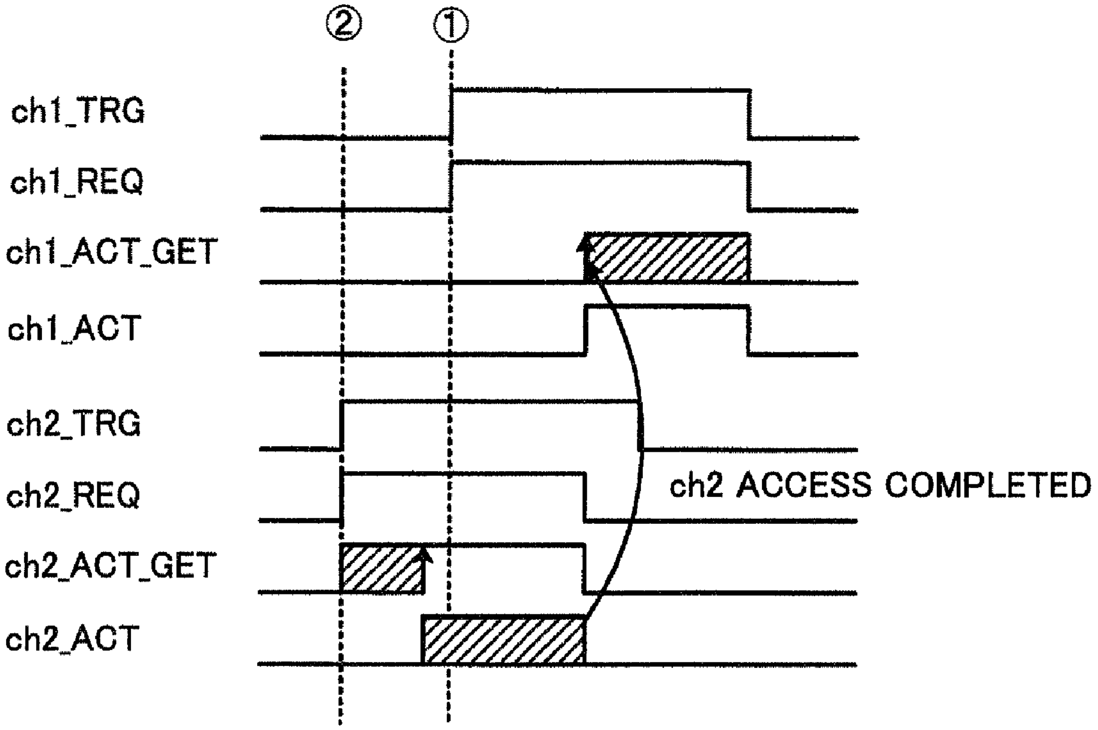
FIG. 13 shows yet another specific example of operation of the arbiter circuit.

FIG. 13 shows a further exemplary case of arbitrating the channels ch1 and ch2, wherein the ch2 access request is significantly earlier than the ch1 access request (ch2_ACT_GET rises earlier than the request signal ch1_REQ).

When the delayed trigger signal is input to the AND gate 354*b* of the arbiter circuit 35*b*, the request signal ch1_REQ is "0". Accordingly, the channel ch2 acquires the access right and the arbiter circuit 35*b* outputs the memory access permission signal ch2_ACT, whereupon the channel ch2 accesses the memory 37. On completion of the access of the channel ch2, the channel ch1 acquires the access right and the arbiter circuit 35*a* outputs the memory access permission signal ch1_ACT, so that the channel ch1 accesses the memory 37.

Figure 14:
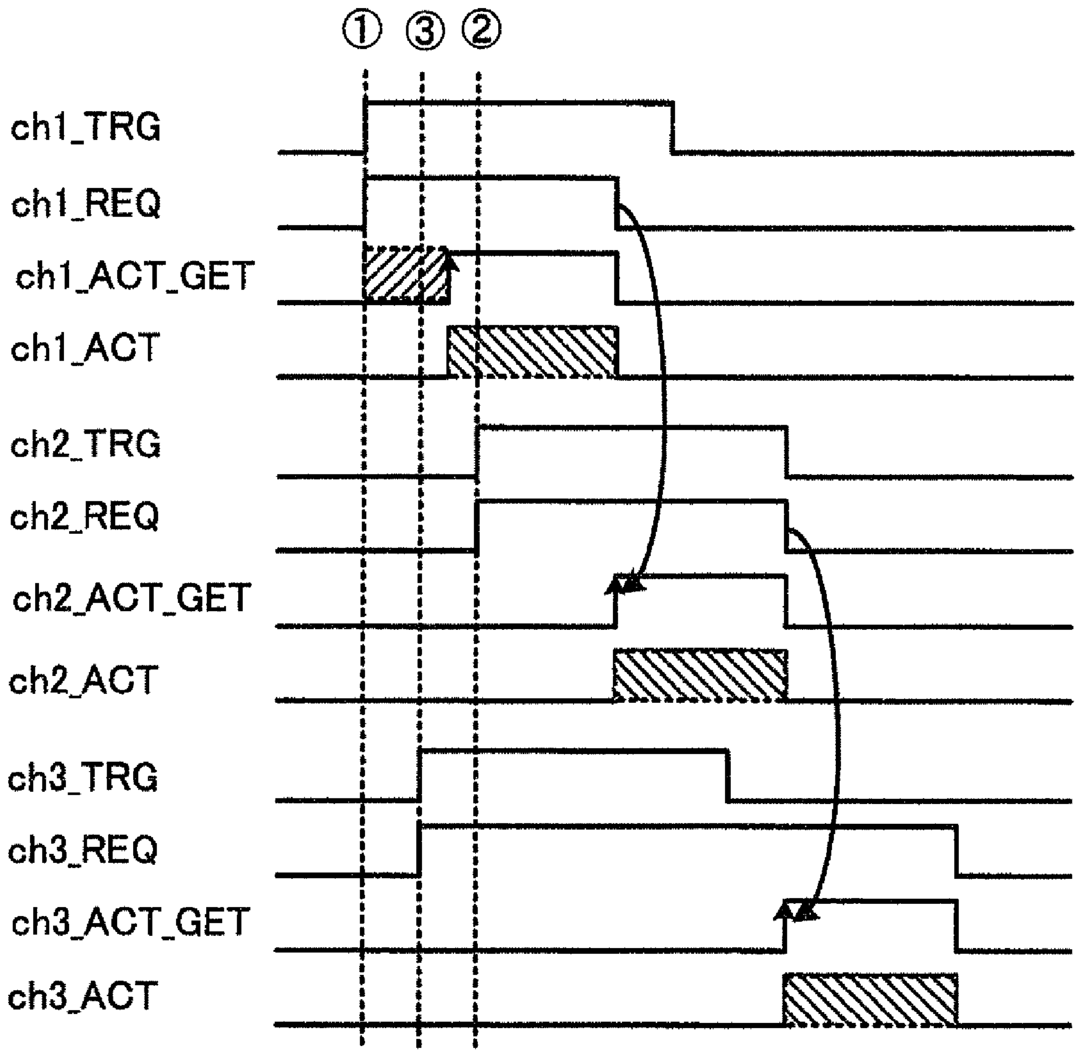
FIG. 14 shows a further specific example of operation of the arbiter circuit.

FIG. 14 shows an exemplary case of arbitrating the channels ch1 to ch3, wherein the access request is made in the order: ch1→ch3→ch2.

When the delayed trigger signal is input to the AND gate 354*a* of the arbiter circuit 35*a*, the memory access permission signals ch2_ACT and ch3_ACT are both "0". Accordingly, the channel ch1 acquires the access right and the arbiter circuit 35*a* outputs the memory access permission signal ch1_ACT, whereupon the channel ch1 accesses the memory 37. While the channel ch1 is accessing the memory 37, the request signal ch2_REQ turns to "1". When the access of the channel ch1 is completed, the request signal ch1_REQ and the memory access permission signal ch3_ACT are both "0". Therefore, the arbiter circuit 35*b* outputs the memory access permission signal ch2_ACT, so that the channel ch2 accesses the memory 37. When the access of the channel ch2 is completed, the request signals ch1_REQ and ch2_REQ are both "0". Accordingly, the arbiter circuit 35*c* outputs the memory access permission signal ch3_ACT, whereupon the channel ch3 accesses the memory 37.

Figure 15:
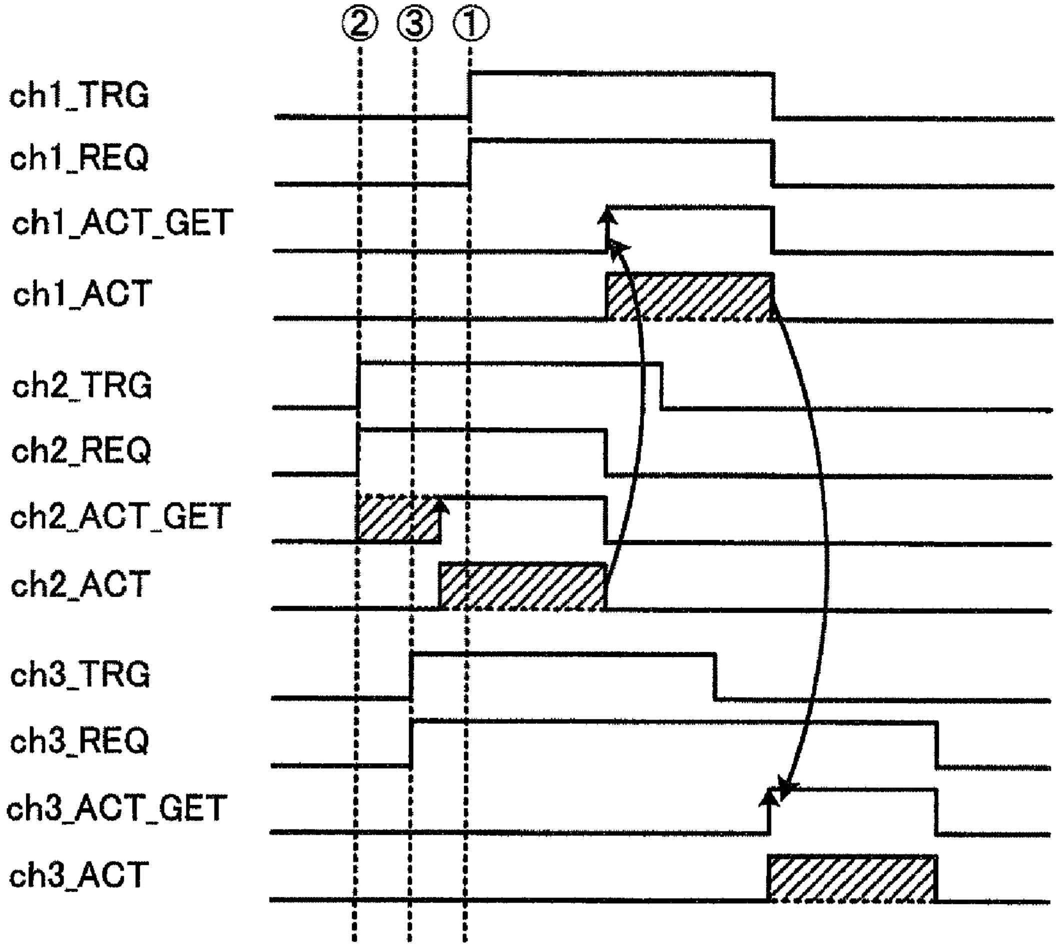
FIG. 15 shows a still further specific example of operation of the arbiter circuit.

FIG. 15 shows another exemplary case of arbitrating the channels ch1 to ch3, wherein the access request is made in the order: ch2→ch3→ch1.

When the delayed trigger signal is input to the AND gate 354*b* of the arbiter circuit 35*b*, the request signal ch1_REQ and the memory access permission signal ch3_ACT are both "0". Accordingly, the channel ch2 acquires the access right and the arbiter circuit 35*b* outputs the memory access permission signal ch2_ACT, whereupon the channel ch2 accesses the memory 37. While the channel ch2 is accessing the memory 37, the request signal ch1_REQ of the channel ch1 turns to "1". When the access of the channel ch2 is completed, the memory access permission signal ch3_ACT is "0". Thus, the arbiter circuit 35*a* outputs the memory access permission signal ch1_ACT, so that the channel ch1 accesses the memory 37. While the channel ch1 is accessing the memory 37, the request signal ch3_REQ turns to "1". When the access of the channel ch1 is completed, the request signals ch1_REQ and ch2_REQ are both "0". Accordingly, the arbiter circuit 35*c* outputs the memory access permission signal ch3_ACT, whereupon the channel ch3 accesses the memory 37.

As described above, in the display control circuit 10 of this embodiment, a higher-priority channel checks only the status of establishment of the bus access right with respect to lower-priority channels to determine whether or not the bus access right is available, and a lower-priority channel temporarily hands over the bus access right to a higher-priority channel if the higher-priority channel makes an access request before the lower-priority channel acquires the bus access right. Thus, it is unnecessary to use complicated circuitry and the condition for making a decision has only to be specified to carry out arbitration and avoid contention, making it possible to simplify the circuit configuration. Also, since a CPU or the like is not used, the display control circuit 10 can be fabricated at low cost.

Further, the display control circuit 10 requires only one memory 37, thus making it possible to reduce the number of memories and also to lessen data write operations.

Moreover, the arbiter circuits 35*a* to 35*d* are provided with the delay circuits 352*a* to 352*d*, respectively, so as to create a time difference between the request signal output timing and the access right acquisition timing, whereby arbitration can be performed easily and reliably.

In the foregoing embodiment, the arbiter circuit 35*a*, for example, is so configured as to output the act condition fulfillment signal ch1_ACT_GET by obtaining the AND of the output from the channel arbitration condition output unit 353*a* and the delayed trigger signal from the delay circuit 352*a*. Instead of the delayed trigger signal, the edge of the succeeding trigger pulse ch1_TRG (succeeding SCL pulse) may be used as the trigger signal.

A display control circuit according to a second embodiment will be now described.

The following description of the second embodiment is focused on the differences between the first and second embodiments, and description of the elements and operation identical with those of the display control circuit of the first embodiment is omitted.

Figure 16:
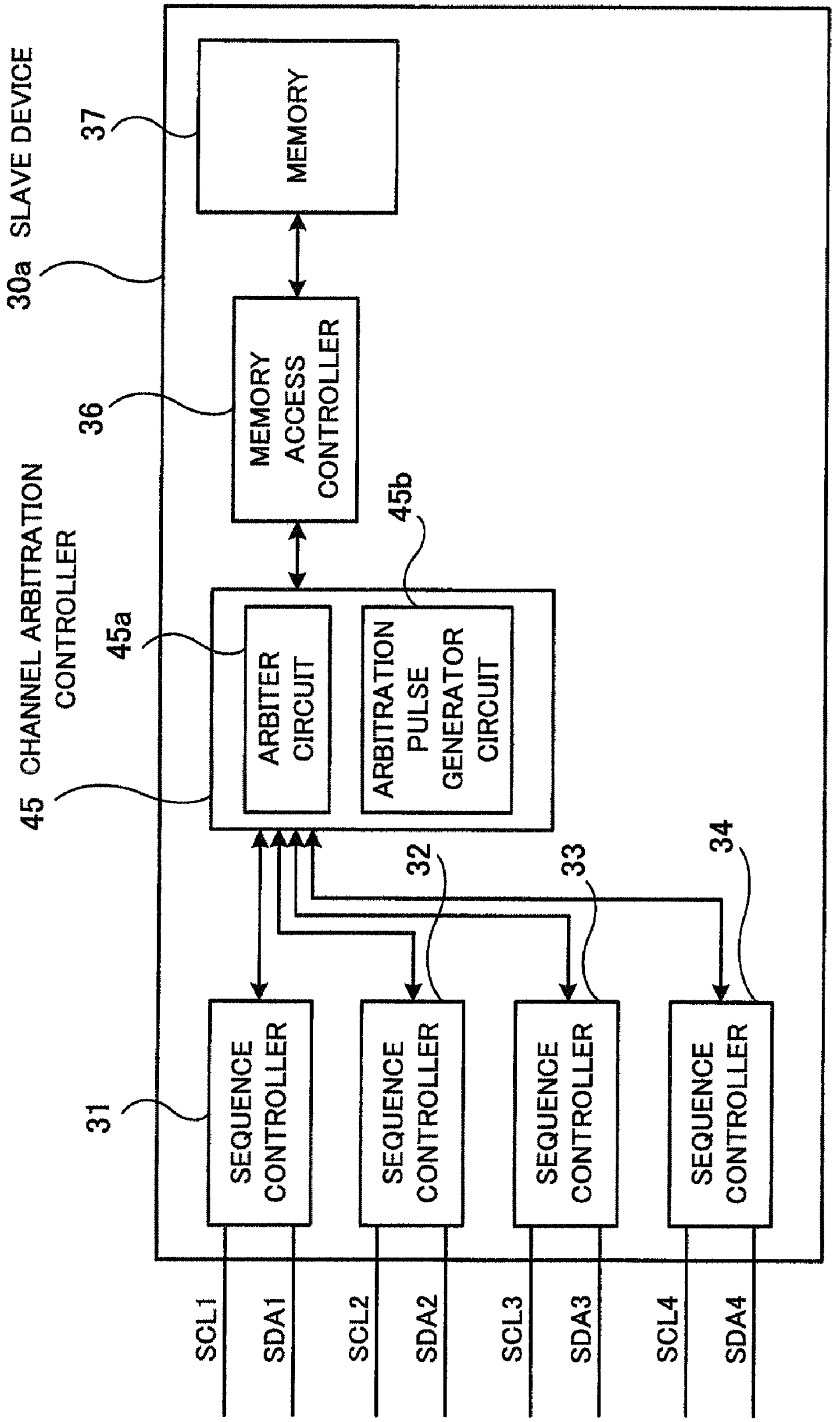
FIG. 16 is a circuit diagram of a slave device according to a second embodiment.

FIG. 16 is a circuit diagram of a slave device according to the second embodiment.

The slave device 30*a* of the display control circuit of the second embodiment has a channel arbitration controller configured differently from the counterpart of the first embodiment.

The channel arbitration controller 45 includes an arbiter circuit 45*a* and an arbitration pulse generator circuit 45*b*.

The arbiter circuit 45*a* is a system without (not using) a system clock. The sources 100, 200, 300 and 400 asynchronously request access independently of one another, and the arbiter circuit 45*a* synchronizes and arbitrates the access requests on the basis of arbitration pulses input thereto.

The arbitration pulse generator circuit 45*b* generates arbitration pulses by delaying the input trigger signals from the individual channels, and outputs the generated pulses to the arbiter circuit 45*a*.

Figure 17:
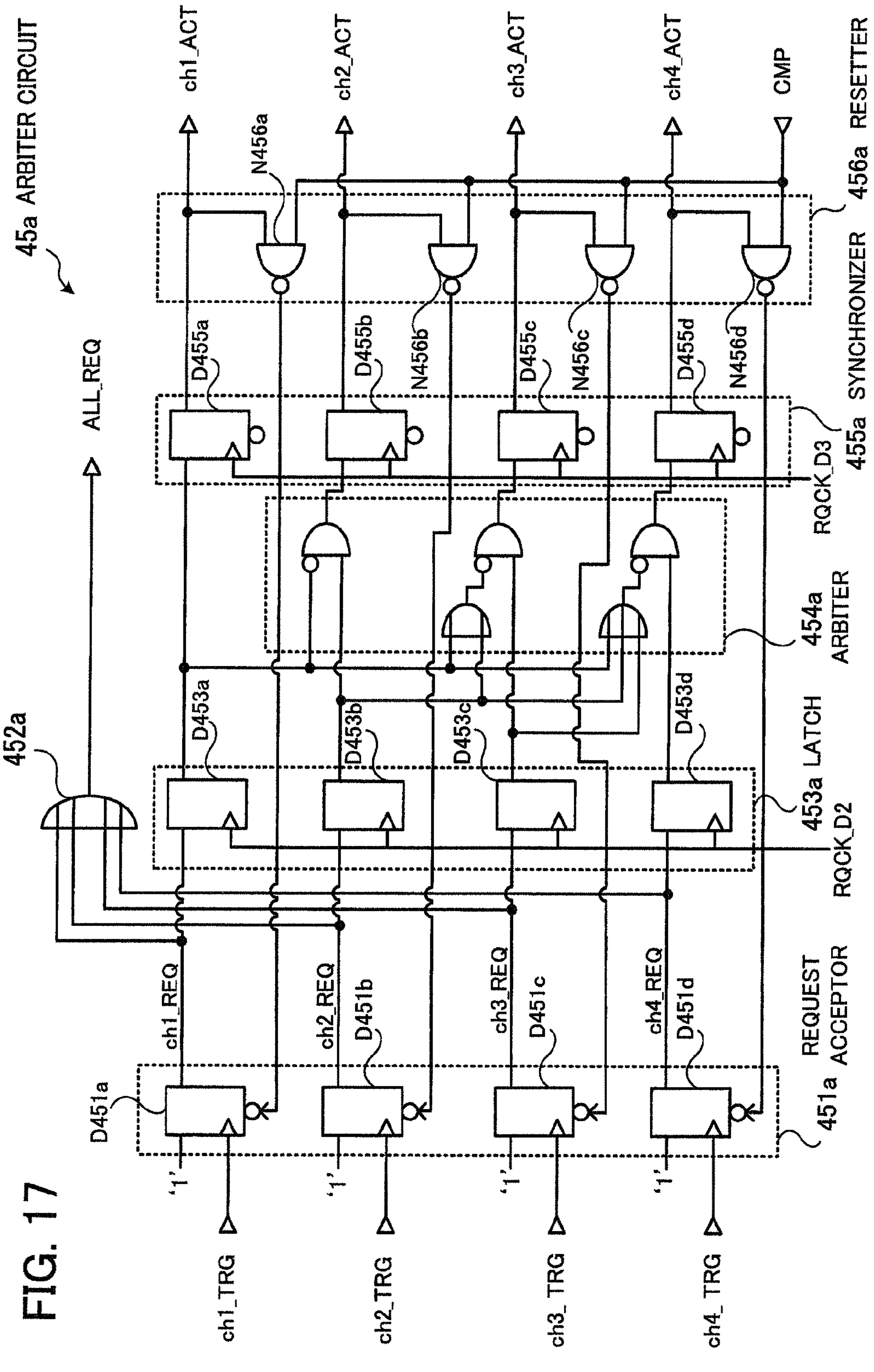
FIG. 17 is a circuit diagram of an arbiter circuit of the second embodiment.

FIG. 17 is a circuit diagram of the arbiter circuit according to the second embodiment.

The arbiter circuit 45*a* comprises a request acceptor 451*a*, an OR gate 452*a*, a latch 453*a*, an arbiter 454*a*, a synchronizer 455*a*, and a resetter 456*a*.

The request acceptor 451*a* includes D-FFs D451*a* to D451*d* for accepting access requests input asynchronously from the respective channels.

The OR gate 452*a* obtains the OR of outputs from the respective D-FFs D451*a* to D451*d* and outputs the result.

The latch 453*a* includes D-FFs D453*a* to D453*d* supplied with the outputs of the respective D-FFs D451*a* to D451*d*. The D-FFs D453*a* to D453*d* are synchronized on the basis of an arbitration pulse signal RQCK_D2 generated by the arbitration pulse generator circuit 45*b*.

The arbiter 454*a* arbitrates the access requests of the respective channels in accordance with the output from the latch 453*a*.

The synchronizer 455*a* deterministically settles the access request arbitrated by the arbiter 454*a*, in accordance with an arbitration pulse signal RQCK_D3 generated by the arbitration pulse generator circuit 45*b*.

The resetter 456*a* has NAND gates N456*a* to N456*d* each for deriving the NAND of the memory access completion signal CMP and the memory access permission signal of the corresponding channel and outputting the result to a corresponding one of the D-FFs D451*a* to D451*d*.

Operation of the arbiter circuit 45*a* will be now described.

When the trigger signal is input to any one of the D-FFs D451*a* to D451*d* of the request acceptor 451*a*, the corresponding D-FF outputs a request signal. Thus, the OR gate 452*a* outputs a memory access request signal ALL_REQ. When the arbitration pulse signal RQCK_D2 is input to the latch 453*a*, the D-FFs D453*a* to D453*d* of the latch 453*a* synchronously output "1" or "0". In accordance with the input values "1" or "0", the arbiter 454*a* outputs arbitration signals to the D-FFs D455*a* to D455*d*. Specifically, the arbiter 454*a* outputs "1" to the D-FF of the synchronizer 455*a* associated with the D-FF of the latch 453*a* from which the request signal has been output, and outputs "0" to the other D-FFs of the synchronizer 455*a*.

Then, when the synchronizer 455*a* is input with the arbitration pulse signal RQCK_D3, the D-FFs D455*a* to D455*d* synchronously output "1" or "0". Specifically, only the D-FF input with the value "1" outputs the memory access permission signal.

In the second embodiment, the memory access completion signal CMP is active when it is low (low-active), and thus remains at "1" when any one of the channels is accessing the memory. When the memory access is completed, the memory access completion signal CMP is input to the arbiter circuit 45*a*. Accordingly, among the NAND gates N456*a* to N456*d* of the resetter 456*a*, only the NAND gate of the channel possessing the bus access right shows an output change to "1", so that the corresponding one of the D-FFs D451*a* to D451*d* of the request acceptor 451*a* is reset to "0". As a result, the arbiter circuit 45*a* resumes the request accepting state.

Figure 18:
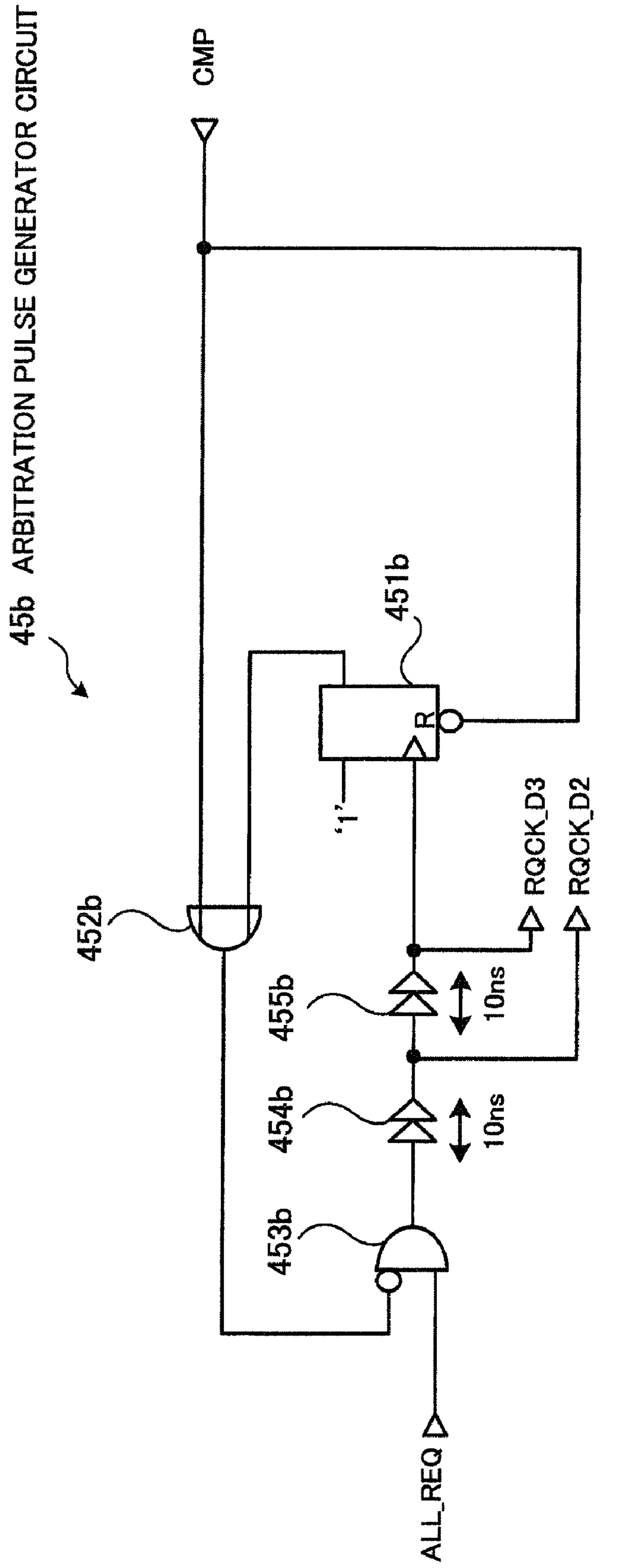
FIG. 18 is a circuit diagram of an arbitration pulse generator circuit.

FIG. 18 is a circuit diagram of the arbitration pulse generator circuit.

The arbitration pulse generator circuit 45*b* includes a D-FF 451*b*, an AND gate 452*b* for obtaining the AND of the memory access completion signal CMP and the output from the D-FF 451*b*, an AND gate 453*b* for obtaining the AND of the memory access request signal ALL_REQ from the arbiter circuit 45*a* and the inverted output of the AND gate 452*b*, an arbitration pulse signal generator 454*b* for generating the arbitration pulse signal RQCK_D2 by delaying the output of the AND gate 453*b* for 10 ns (predetermined time), and an arbitration pulse signal generator 455*b* for generating the arbitration pulse signal RQCK_D3 by delaying the arbitration pulse signal RQCK_D2 for 10 ns (predetermined time).

Operation of the arbitration pulse generator circuit will be now explained.

When the circuit 45*b* is in an initial state, the output of the D-FF 451*b* is "0". Accordingly, the AND gate 452*b* outputs "0", so that the AND gate 453*b* is input with "1".

If, in this state, the memory access request signal ALL_REQ is input to the AND gate 453*b*, the AND gate 453*b* outputs "1". Thus, the arbitration pulse signal generators 454*b* and 455*b* respectively generate the arbitration pulse signals RQCK_D2 and RQCK_D3 and output the generated signals, whereupon the value "1" is input to the CK terminal of the D-FF 451*b*, causing the D-FF 451*b* to output "1".

Since the memory access completion signal CMP is a low-active signal, the AND gate 452*b* outputs "1" and the inverted value "0" is input to the AND gate 453*b*. Consequently, the arbitration pulse signal generators 454*b* and 455*b* stop generating the respective arbitration pulse signals RQCK_D2 and RQCK_D3.

The arbitration pulse generator circuit 45*b* remains in this state until the memory access is completed.

On completion of the memory access, the memory access completion signal CMP (low-active signal) is input. Thus, the AND gate 452*b* outputs "0" and the inverted value "1" is input to the AND gate 453*b*.

If, at this time, a request signal REQ is received from any other channel, the memory access request signal ALL_REQ is input to the AND gate 453*b*, in which case the arbitration pulse signals are generated again and the arbitration is continued.

The display control circuit of the second embodiment provides the same advantageous effects as those achieved by the display control circuit 10 of the first embodiment.

In addition, the display control circuit of the second embodiment is configured so as to generate synchronizing pulses by itself for arbitration purposes, and therefore, arbitration can be easily and reliably executed in fully asynchronous systems with no system clock.

Figure 19:
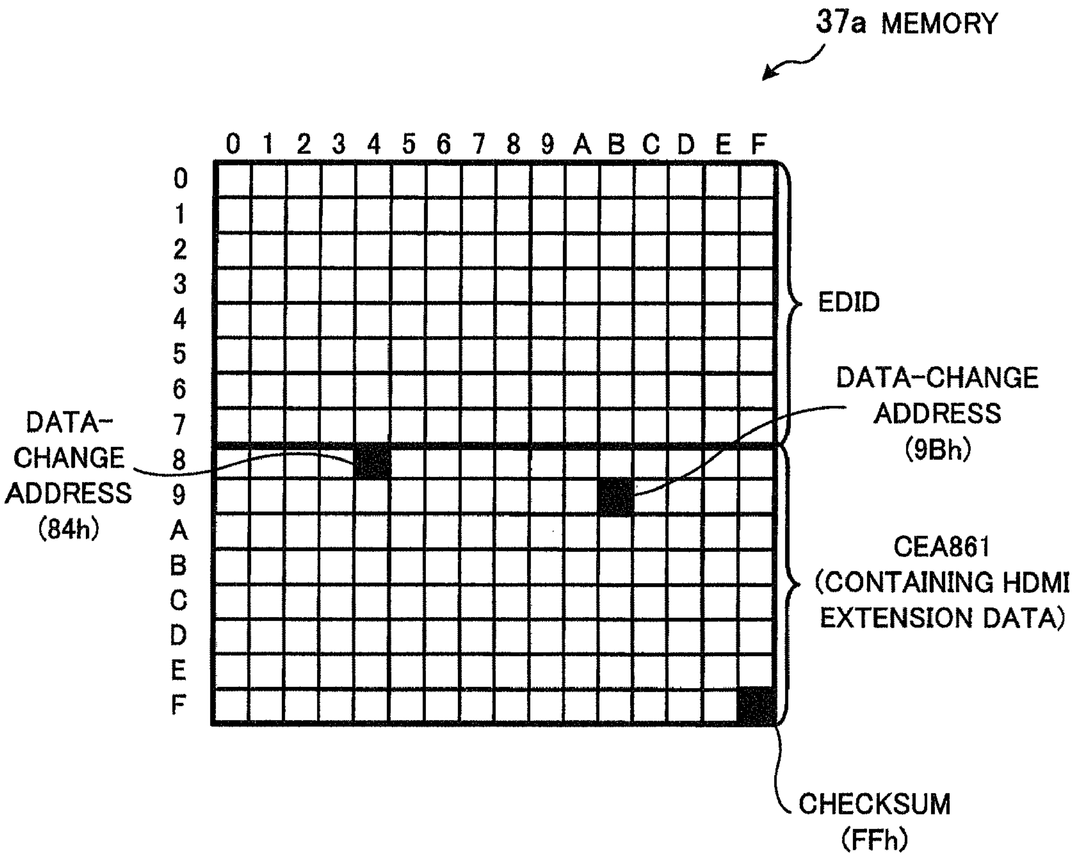
FIG. 19 schematically illustrates the internal arrangement of a memory.

Meanwhile, data to be stored in the extended EDID field is defined by the CEA861 standard, as shown in FIG. 19. Further, CEA861 defines an extended data field reserved exclusively for HDMI. The extended data field includes addresses (hereinafter referred to as "data-change addresses") where different data for respective different channels is stored.

FIG. 19 schematically illustrates the internal arrangement of the memory.

In the memory 37*a* shown in FIG. 19, the addresses from 00h (hexadecimal) to 7Fh constitute the EDID field, and the addresses from 80h to FFh constitute the CEA861 field (containing HDMI extension data). Suppose that the address 9Bh, for example, among the addresses of the memory 37*a*, is a data-change address. In this case, where an access request is made with respect to that address, the accessing channel needs to be determined (identified) and then the data read from the data-change address needs to be changed in part before being output to the source of access.

Also, the data-change addresses are not always fixed. Accordingly, in cases where the initial reset has terminated or I2C slave addresses coincide or a checksum value has been written in the memory, for example, tracing explained below needs to be performed to specify the data-change addresses.

The following explanation is based on the assumption that a tracing start address is 84h (fixed), by way of example.

Figure 20:
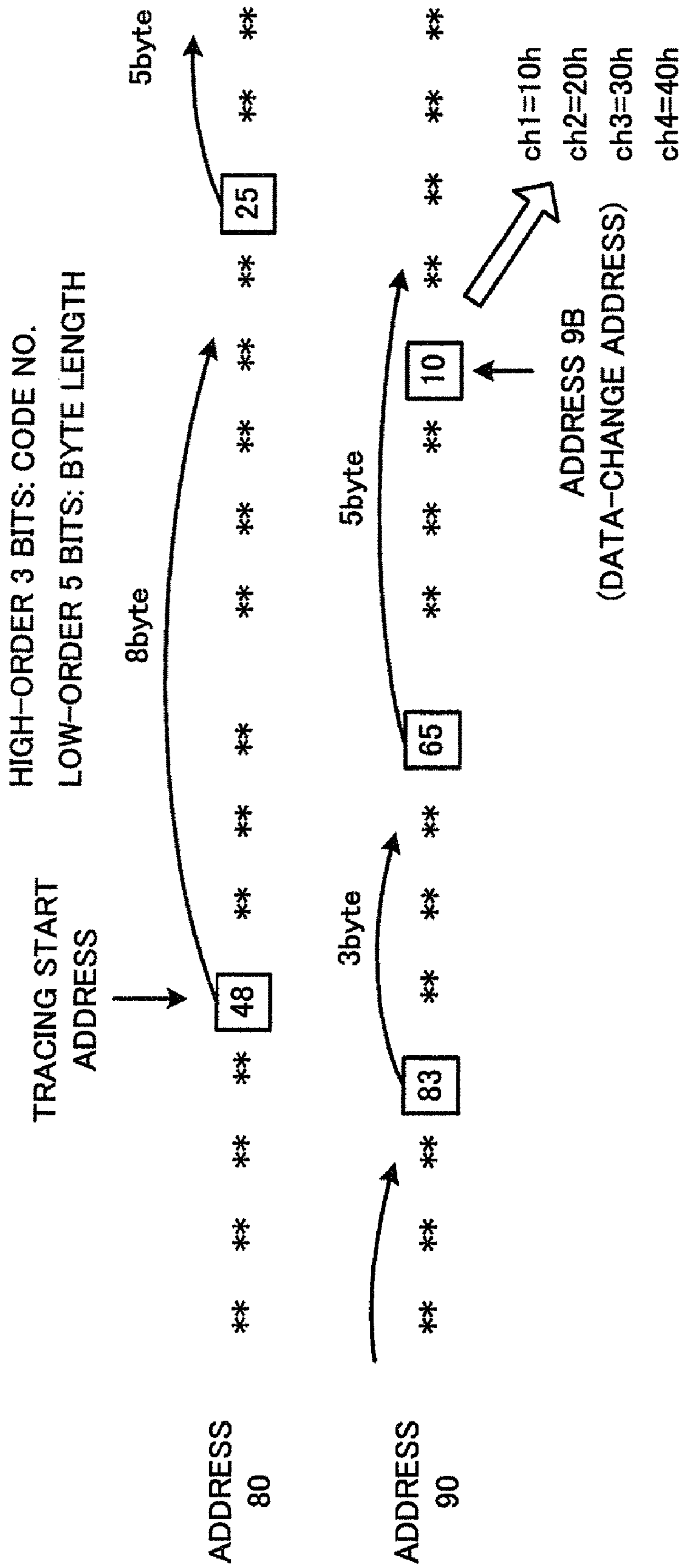
FIG. 20 illustrates a specific example of tracing.

FIG. 20 illustrates a specific example of the tracing operation.

The addresses of the memory 37*a* have a chain structure addressable by a pointer made up of code number and byte length written in the memory 37*a*. Specifically, of the data stored at each address, the high-order 3 bits indicate a code number and the low-order 5 bits indicate a byte length. It is prescribed that data whose high-order 3 bits are "011b (binary)" ("03h") indicates that the address which comes "4h" after the address storing the data is a data-change address.

<1st Tracing>

The data stored at the address 84h is "48h". When expressed in the binary notation, "48h" is equal to "01001000b (binary)", and the high-order 3 bits do not coincide with "011b (binary)". The low-order 5 bits are "01000b (binary)" and equal to "8", and thus, tracing is performed with respect to the address that comes 8 bytes+1 byte after the current address 84h.

<2nd Tracing>

The address to be traced is therefore 8Dh and the data stored at the address 8Dh is "25h". The binary number of "25h" is "001000101b (binary)", and the high-order 3 bits do not coincide with "00101b (binary)". Since the low-order 5 bits are "00101b (binary)" and equal to "5", the address that comes 5 bytes+1 byte after the address 8Dh is traced.

<3rd Tracing>

Thus, the address to be traced is 93h, and the data stored at the address 93h is "83h". When expressed in the binary notation, "83h" is equal to "10000011b (binary)", and the high-order 3 bits do not coincide with "011b (binary)". Since the low-order 5 bits are "00011b (binary)" and equal to "3", tracing is then carried out with respect to the address that comes 3 bytes+1 byte after the address 93h.

<4th Tracing>

The address to be traced is therefore 97h, and the data stored at the address 97h is "65h". The binary number of "65h" is "01100101b (binary)", and the high-order 3 bits coincide with "011b (binary)". The address that comes 4 bits after the address 97h is 9Bh, which means that the address 9Bh is a data-change address.

When the address 9Bh of the memory 37*a* is accessed thereafter, the data read from the data-change address is changed in part before being output to the source of access. For example, "10h" is substituted if the access requesting channel is ch1, "20h" is substituted if the access requesting channel is ch2, "30h" is substituted if the access requesting channel is ch3, and "40h" is substituted if the access requesting channel is ch4.

In the following, a display control circuit of a third embodiment, which has the aforementioned function, will be described.

The following description of the third embodiment is focused on the differences between the first and third embodiments, and description of the elements and operation identical with those of the display control circuit of the first embodiment is omitted.

The display control circuit of the third embodiment differs from that of the first embodiment only in that the slave device is configured differently from the counterpart of the first embodiment.

Figure 21:
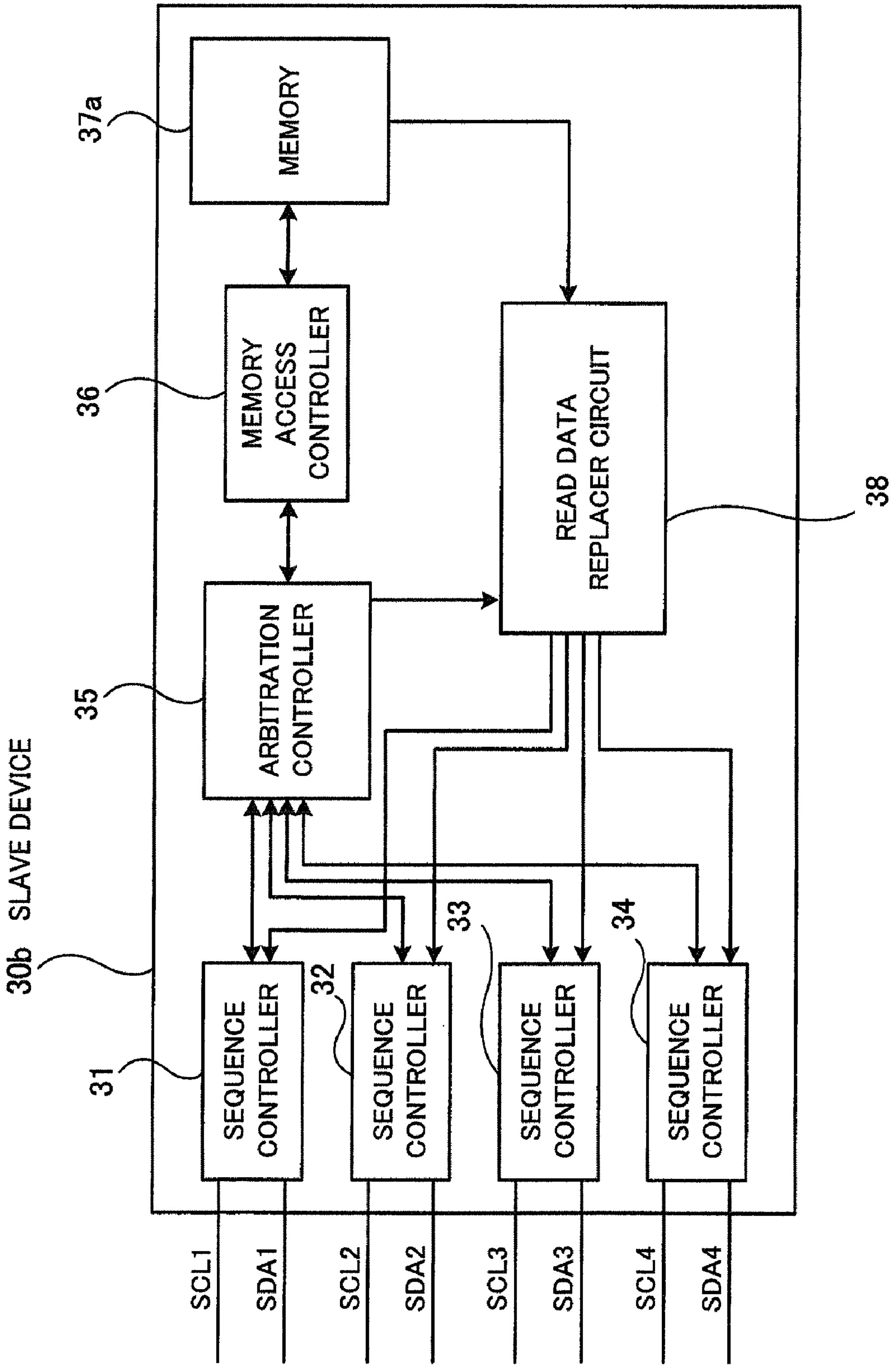
FIG. 21 is a circuit diagram of a slave device according to a third embodiment.

FIG. 21 is a circuit diagram of the slave device according to the third embodiment.

To implement the aforementioned function, the slave device 30*b* is additionally provided with a read data replacer circuit 38.

Figure 22:
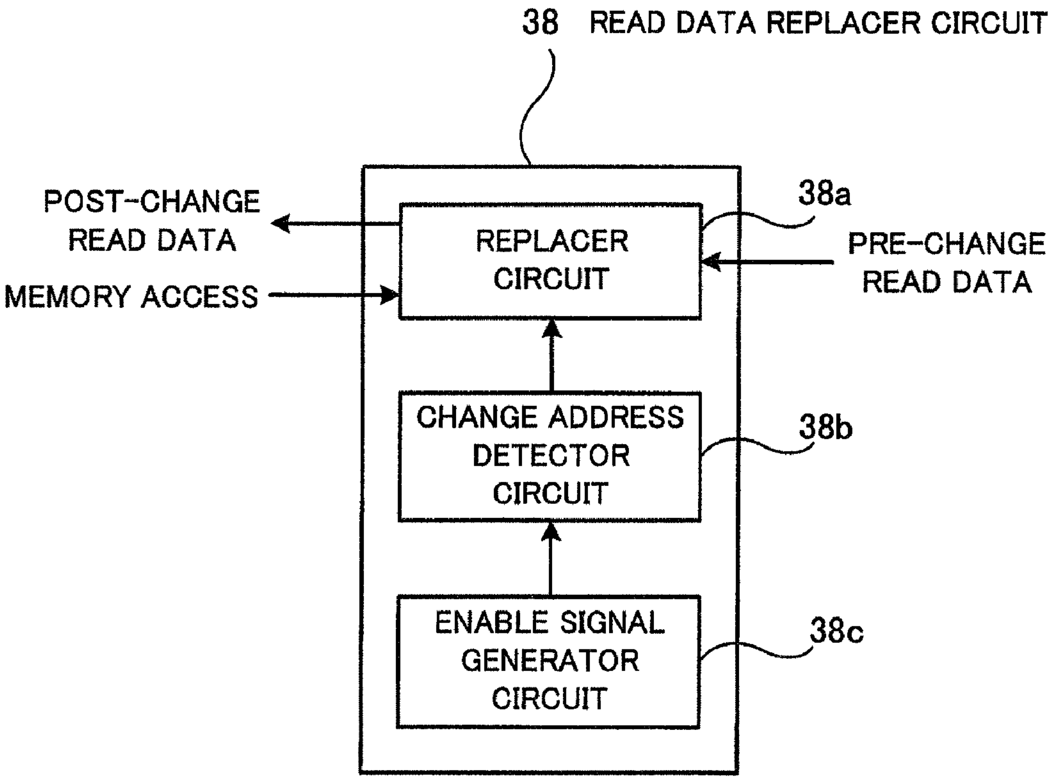
FIG. 22 is a block diagram of a read data replacer circuit.

FIG. 22 is a block diagram of the read data replacer circuit.

The read data replacer circuit 38 includes a replacer circuit 38*a*, a change address detector circuit 38*b*, and an enable signal generator circuit 38*c*.

The replacer circuit 38*a* determines whether the address (memory access address) with respect to which access has been requested is a data-change address or not. If the memory access address is not a data-change address, the replacer circuit 38*a* directly outputs the data read from the memory access address. On the other hand, if the memory access address is a data-change address, the replacer circuit 38*a* replaces the data (hereinafter referred to as "pre-change read data") read from the memory access address with replacement (substitute) data (hereinafter referred to as "post-change read data") in accordance with a format preset therein, and sends the post-change read data to the source of access.

The change address detector circuit 38*b* performs the tracing operation to identify data-change addresses and notifies the replacer circuit 38*a* of the identified data-change addresses.

The enable signal generator circuit 38*c* generates an enable signal for operating the change address detector circuit 38*b*.

Figure 23:
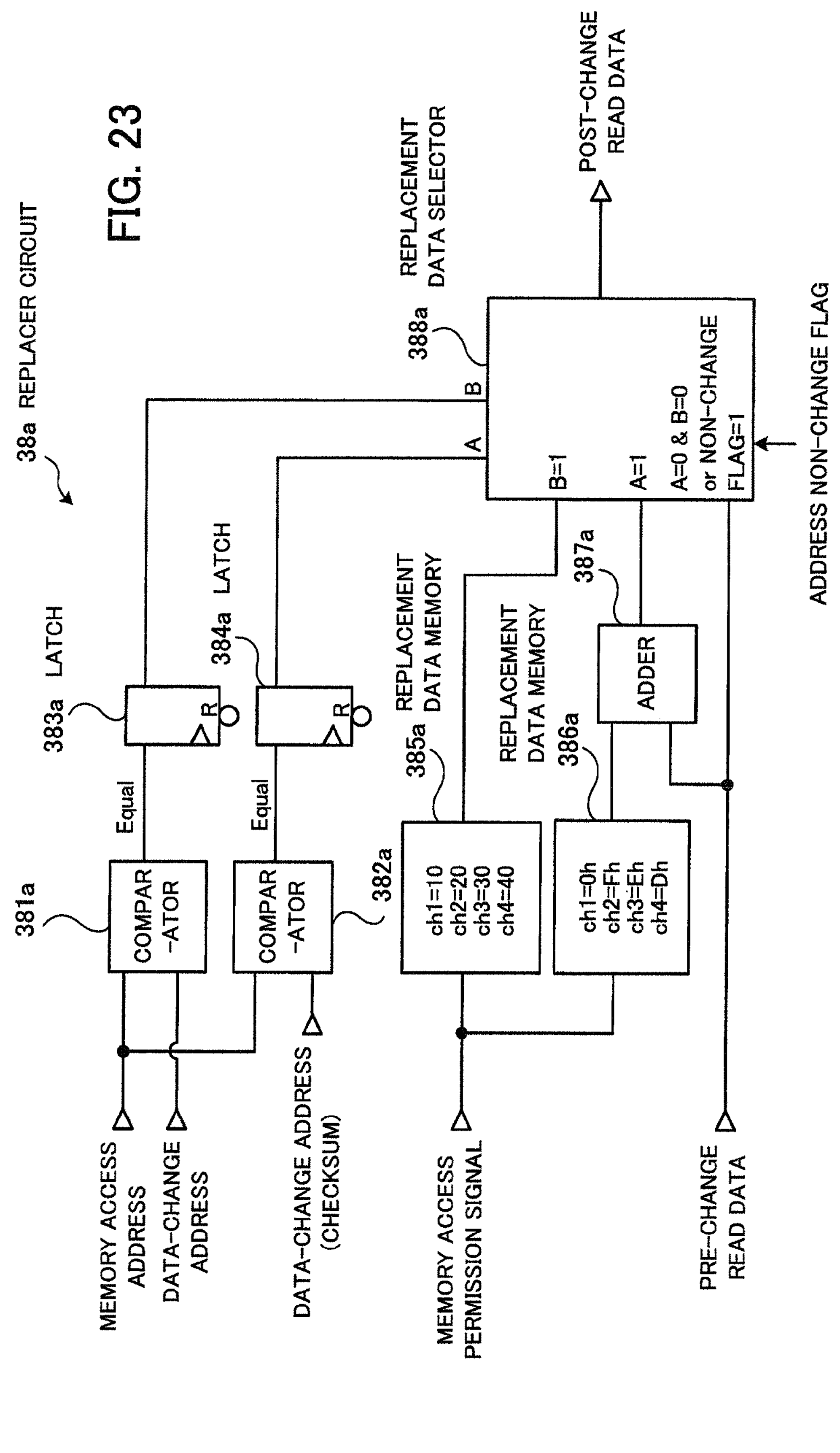
FIG. 23 is a circuit diagram of a replacer circuit.

FIG. 23 is a circuit diagram of the replacer circuit.

The replacer circuit 38*a* includes comparators 381*a* and 382*a*, latches 383*a* and 384*a*, replacement data memories 385*a* and 386*a*, an adder 387*a*, and a replacement data selector 388*a*.

The comparators 381*a* and 382*a* compare the memory access address with their respective targets of comparison, to determine whether the memory access address is a data-change address or not.

The target of comparison used in the comparator 381*a* is the data-change address output from the change address detector circuit 38*b*.

The comparator 382*a* uses, as its target of comparison, a prespecified (fixed) data-change address (e.g., checksum "FF").

The latches 383*a* and 384*a* are each constituted by a D-FF and latch the values output from the respective comparators 381*a* and 382*a*.

The replacement data memories 385*a* and 386*a* each store replacement data for the respective channels. Specifically, the replacement data memory 385*a* stores replacement data that is used when the memory access address coincides with the data-change address output from the change address detector circuit 38*b*, to substitute for the high-order 4 bits of the pre-change read data read from the data-change address. The replacement data corresponding to the input memory access permission signal (ch1_ACT to ch4_ACT) is output from the replacement data memory 385*a*.

In the example shown in FIG. 20, where the address 9Bh of the memory has been accessed, the high-order 4 bits of the value "10h" stored at the address 9Bh are replaced with the replacement data. The high-order 4 bits are replaced by "10h" if the input memory access permission signal is ch1_ACT (if the access requesting channel is ch1), replaced by "20h" if the input memory access permission signal is ch2_ACT, replaced by "30h" if the input memory access permission signal is ch3_ACT, and replaced by "40h" if the input memory access permission signal is ch4_ACT.

The replacement data memory 386*a* stores replacement data that is used when the memory access address coincides with the prespecified data-change address, to be added to the pre-change read data read from the prespecified data-change address. The replacement data corresponding to the input memory access permission signal (ch1_ACT to ch4_ACT) is output from the replacement data memory 386*a*.

The adder 387*a* adds together the pre-change read data read from the memory 37*a* and the replacement data output from the replacement data memory 386*a*, and outputs the result obtained.

In accordance with the values latched by the latches 383*a* and 384*a*, the replacement data selector 388*a* selects one of the value output from the replacement data memory 385*a*, the value output from the adder 387*a* and the pre-change read data, and outputs the selected value as the post-change read data to the source of access. Specifically, if the values A and B latched by the latches 384*a* and 383*a* are "1" and "0", respectively, the replacement data selector 388*a* outputs the output value of the adder 387*a* as the post-change read data. On the other hand, if the values A and B latched by the latches 384*a* and 383*a* are "0" and "1", respectively, the replacement data selector 388*a* outputs the output value of the replacement data memory 385*a* as the post-change read data.

If the values A and B latched by the latches 384*a* and 383*a* are both "0", the replacement data selector 388*a* outputs the pre-change read data directly as the post-change read data.

Also, when input with an address non-change flag "1", described later, the replacement data selector 388*a* outputs the pre-change read data directly as the post-change read data.

Figure 24:
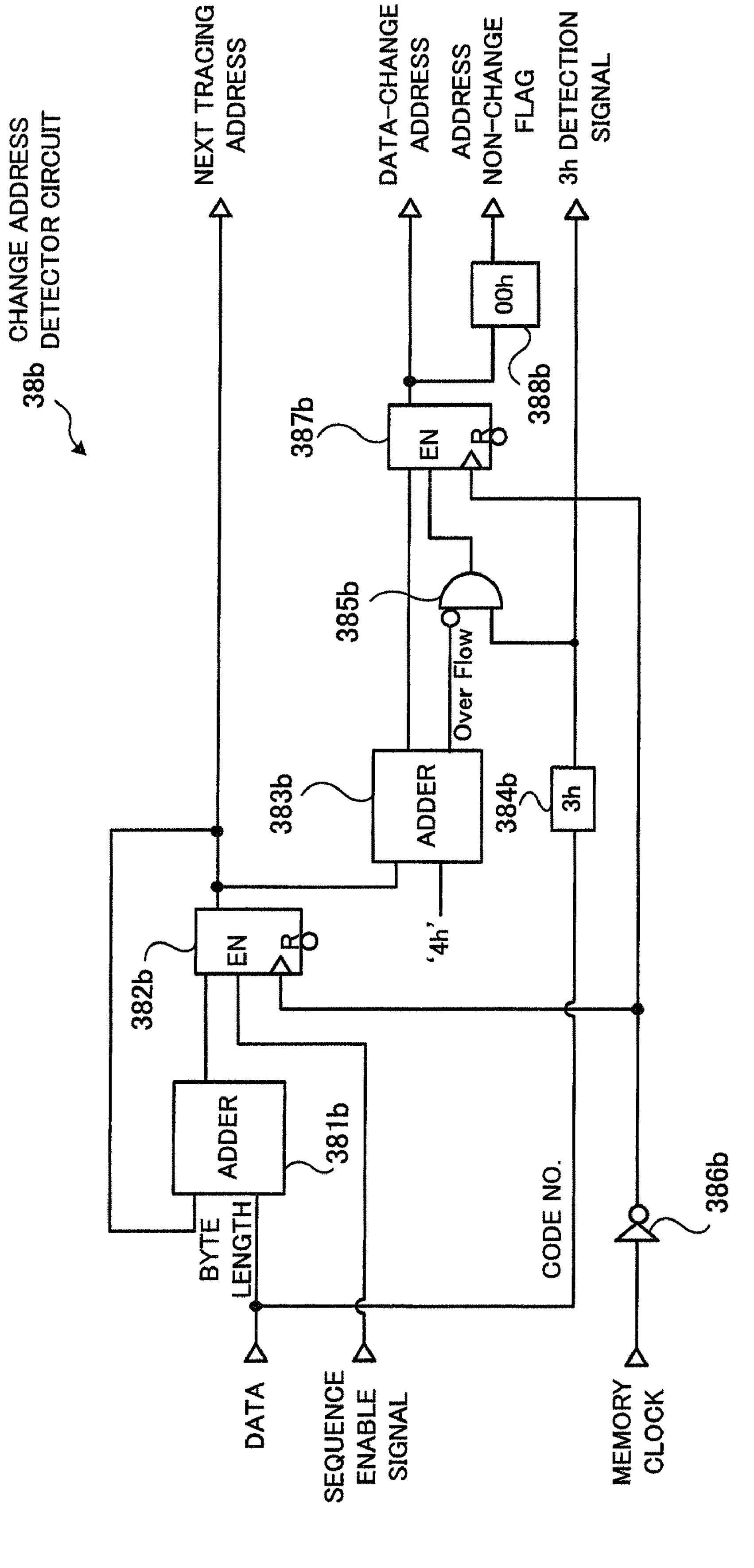
FIG. 24 is a circuit diagram of a change address detector circuit.

FIG. 24 is a circuit diagram of the change address detector circuit.

The change address detector circuit 38*b* includes an adder 381*b*, an FF with enable input (hereinafter "enable-FF") 382*b*, an adder 383*b*, a comparator 384*b*, an AND gate 385*b*, an inverter 386*b*, an enable-FF 387*b*, and a comparator 388*b*.

The adder 381*b* is successively input with the low-order 5 bits (byte length) of data read from the traced addresses and adds, to the input data, the value fed back from the enable-FF 382*b*.

Using a sequence enable signal generated by the enable signal generator circuit 38*c* as an enable input, the enable-FF 382*b* outputs the output value of the adder 381*b*. The initial value of the enable-FF 382*b* is set at the tracing start address (in the example of FIG. 20, "84h").

The adder 383*b* adds "4h" to the value output from the enable-FF 382*b*. If the sum obtained by adding "4h" overflows the address "FFh" of the memory 37*a*, the adder 383*b* outputs "1".

The comparator 384*b* is input with the high-order 3 bits (code number) of data read from the traced address. If the input code number is "3h" ("011b (binary)"), the comparator 384*b* outputs a 3h detection signal "1"; if not, the comparator 384*b* outputs "0".

The AND gate 385*b* obtains the AND of the inverted overflow output of the adder 383*b* and the result of the comparison by the comparator 384*b*. Specifically, the AND gate 385*b* outputs "1" if the sum of the value latched by the enable-FF 382*b* and "4h" does not overflow the address "FFh" of the memory 37*a* and also if the code number of the read data is "3h" ("011b (binary)").

The inverter 386*b* inverts the memory clock signal and outputs the inverted signal to the enable-FF 387*b*.

The enable-FF 387*b* is supplied, as its enable input, with the output of the AND gate 385*b* and outputs, as a data-change address, the sum from the adder 383*b* in synchronism with the output from the inverter 386*b*.

The comparator 388*b* compares the output from the enable-FF 387*b* with "00h" and, if the two coincide, outputs the address non-change flag "1".

Operation of the change address detector circuit 38*b* will be now described.

The adder 381*b* successively adds the byte length of data read from the memory 37*a* to the initial value set beforehand in the enable-FF 382*b*. The sum obtained indicates an address to be traced (read) next.

In parallel with the operation of the adder 381*b*, the adder 383*b* adds "4h" to the output value from the adder 381*b*.

When the value "1" is output from the AND gate 385*b*, the enable-FF 387*b* outputs the sum from the adder 383*b* as a data-change address.

On the other hand, when the value "0" is output from the AND gate 385*b*, the enable-FF 387*b* does not latch data, and since the initial value is "00h", the comparator 388*b* outputs the address non-change flag "1".

Figure 25:
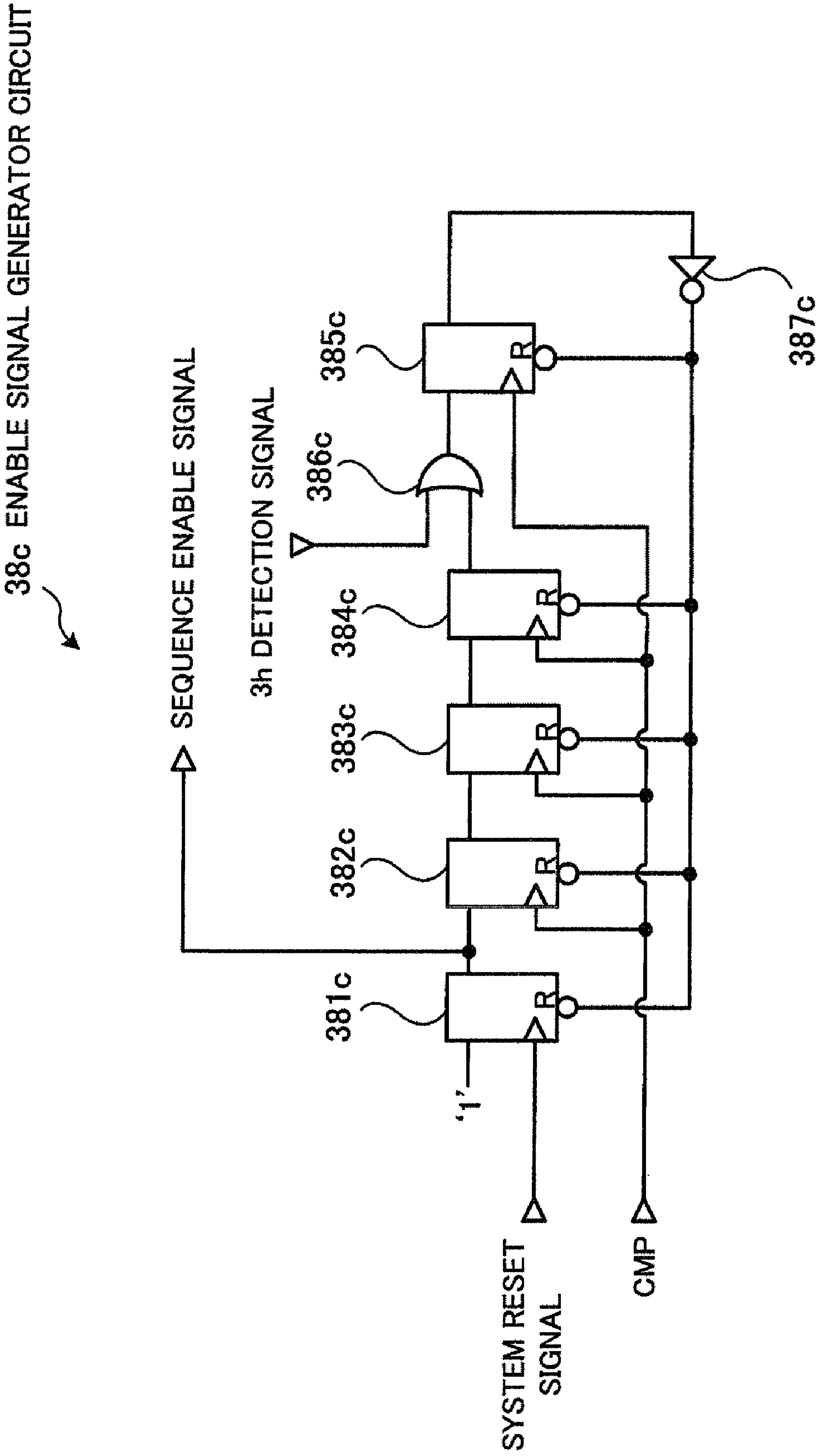
FIG. 25 is a circuit diagram of an enable signal generator circuit.

FIG. 25 is a circuit diagram of the enable signal generator circuit.

The enable signal generator circuit 38*c* includes D-FFs 381*c* to 385*c*, an OR gate 386*c*, and an inverter 387*c*.

The D-FF 381*c* is input with "1" at its D terminal and input with a system reset signal at its clock terminal. The enable signal generator circuit 38*c* outputs, as the sequence enable signal, the output of the D-FF 381*c*.

The D-FFs 382*c* to 385*c* constitute a shift register. If the memory access completion signal CMP is input from the memory access controller 36 four times while the sequence enable signal is "1", the D-FF 385*c* outputs "1".

The OR gate 386*c* outputs "1" if either of the output from the D-FF 384*c* and the output from the comparator 384*b* of the change address detector circuit 38*b* is "1".

Operation of the enable signal generator circuit 38*c* will be now described.

When the system reset signal "1" is input to the clock terminal, the D-FF 381*c* outputs the sequence enable signal "1".

The D-FFs 382*c* to 385*c* constitute a shift register as mentioned above, and thus, as soon as the memory access completion signal CMP is input four times, the D-FF 385*c* outputs "1". Since the inverter 387*c* outputs "0" at this time, the D-FFs 381*c* to 385*c* are reset, so that the sequence enable signal turns to "0".

When a data-change address is discovered before the memory access completion signal CMP is input four times, the 3h detection signal "1" is input to the OR gate 386*c*, causing the OR gate 386*c* to output "1". Thus, also in this case, the D-FF 385*c* outputs "1", turning the sequence enable signal to "0".

The display control circuit of the third embodiment provides the same advantageous effects as those achieved by the display control circuit 10 of the first embodiment.

With the display control circuit of the third embodiment, moreover, data-change addresses can be detected in advance by the change address detector circuit 38*b* when, for example, the system reset is terminated (before the sources 100, 200, 300 and 400 access the memory). Thus, when a data-change address of the memory is accessed by the source 100, 200, 300 or 400, the pre-change read data can be instantly replaced with the replacement data corresponding to the accessing channel just as if different items of data were read from the same address of the same memory. Also, the data stored at the data-change address can be easily changed regardless of whether the stored data is a variable value or fixed value.

Further, where the traced data contains a byte indicating a checksum, for example, a difference between the fixed replacement data and the data to be replaced may be calculated to carry out the replacement.

Moreover, in cases where the sum of byte lengths derived in the process of tracing exceeds the memory address range or no matching code number is found during the tracing, such situations may be regarded as anomaly and the replacement of data may be inhibited.

The data-change address is not always fixed as mentioned above, and accordingly, if the pointer changes as a result of data write in the memory 37*a*, there arises a discrepancy between the data-change address and the intended address. It is therefore necessary that the data-change addresses should be retraced as soon as such a situation occurs. In the following, a display control circuit of a fourth embodiment, which has the retracing function, will be described.

The following description of the fourth embodiment is focused on the differences between the third and fourth embodiments, and description of the elements and operation identical with those of the display control circuit of the third embodiment is omitted.

The display control circuit of the fourth embodiment differs from that of the third embodiment only in that the channel arbitration controller is configured differently from the counterpart of the third embodiment.

Figure 26:
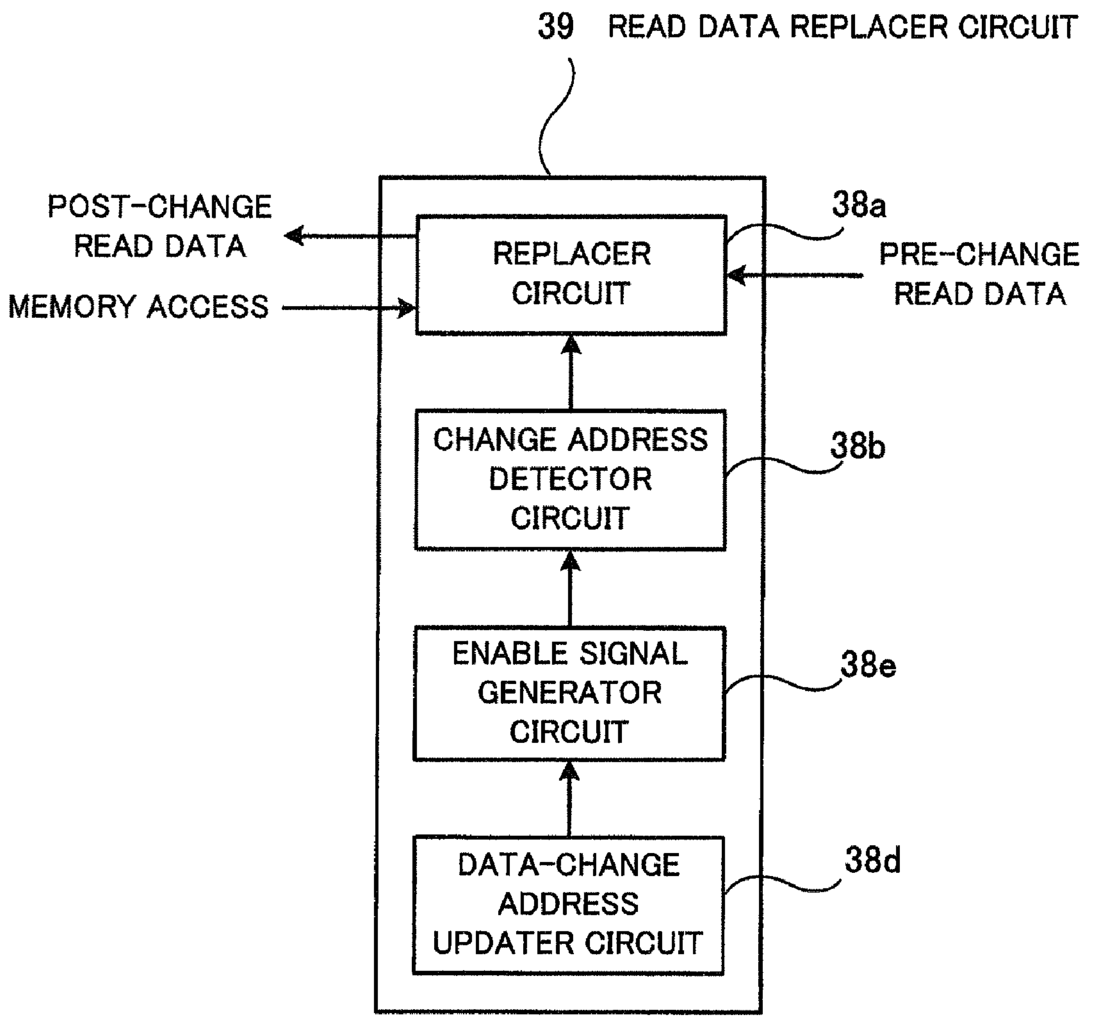
FIG. 26 is a circuit diagram of a read data replacer circuit according to a fourth embodiment.

FIG. 26 is a circuit diagram of a read data replacer circuit according to the fourth embodiment.

The read data replacer circuit 39 includes an enable signal generator circuit 38*e* of which the configuration differs in part from the aforementioned enable signal generator circuit 38*c*, and is further provided a data-change address updater circuit 38*d*. In cases where the pointer has changed due to the data write in the memory 37*a* by the source 100, 200, 300 or 400, the data-change address updater circuit 38*d* updates the data-change address at the time the checksum is written.

Figure 27:
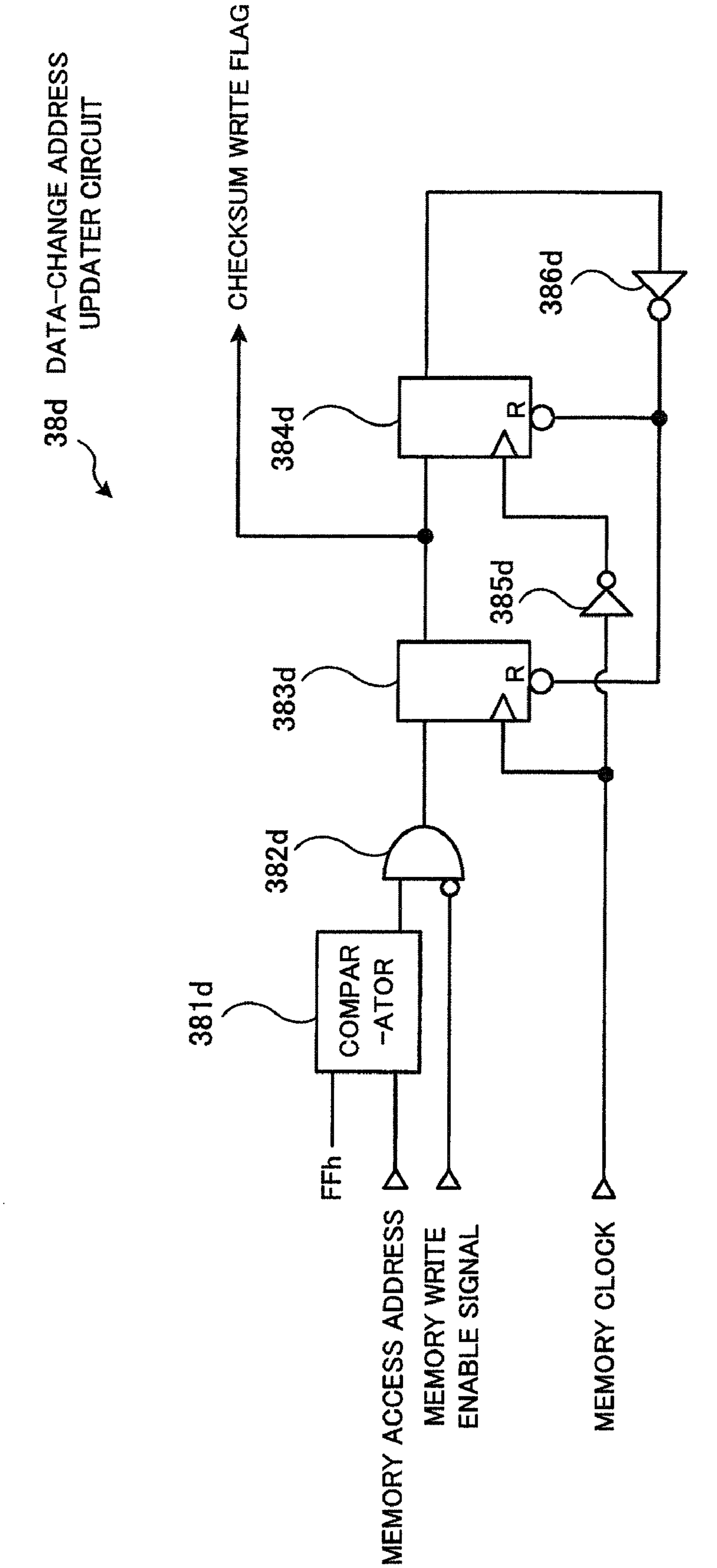
FIG. 27 is a circuit diagram of a data-change address updater circuit.

FIG. 27 is a circuit diagram of the data-change address updater circuit.

The data-change address updater circuit 38*d* is configured to generate a checksum write flag indicating that a checksum byte has been written, and includes a comparator 381*d*, an AND gate 382*d*, D-FFs 383*d* and 384*d*, and inverters 385*d* and 386*d*.

The comparator 381*d* compares the memory access address with the memory address (FFh) for the checksum and, if the two coincide, outputs "1".

The AND gate 382*d* obtains the AND of the output from the comparator 381*d* and the inverted value of a write enable signal (low-active signal) of the memory 37*a*.

Operation of the circuit 38*d* will be now described.

When the memory access address is "FFh" and the memory write enable signal is "0", the AND gate 382*d* outputs "1". Thus, the D-FF 383*d* operates synchronously with the memory clock input and outputs "1", turning the checksum write flag to "1".

Subsequently, the D-FF 384*d* outputs "1" with a lag, and the inverted output "0" of the inverter 386*d* is input to the reset terminals of the D-FFs 383*d* and 384*d*. Consequently, the D-FFs 383*d* and 384*d* both output "0", turning the checksum write flag to "0".

Figure 28:
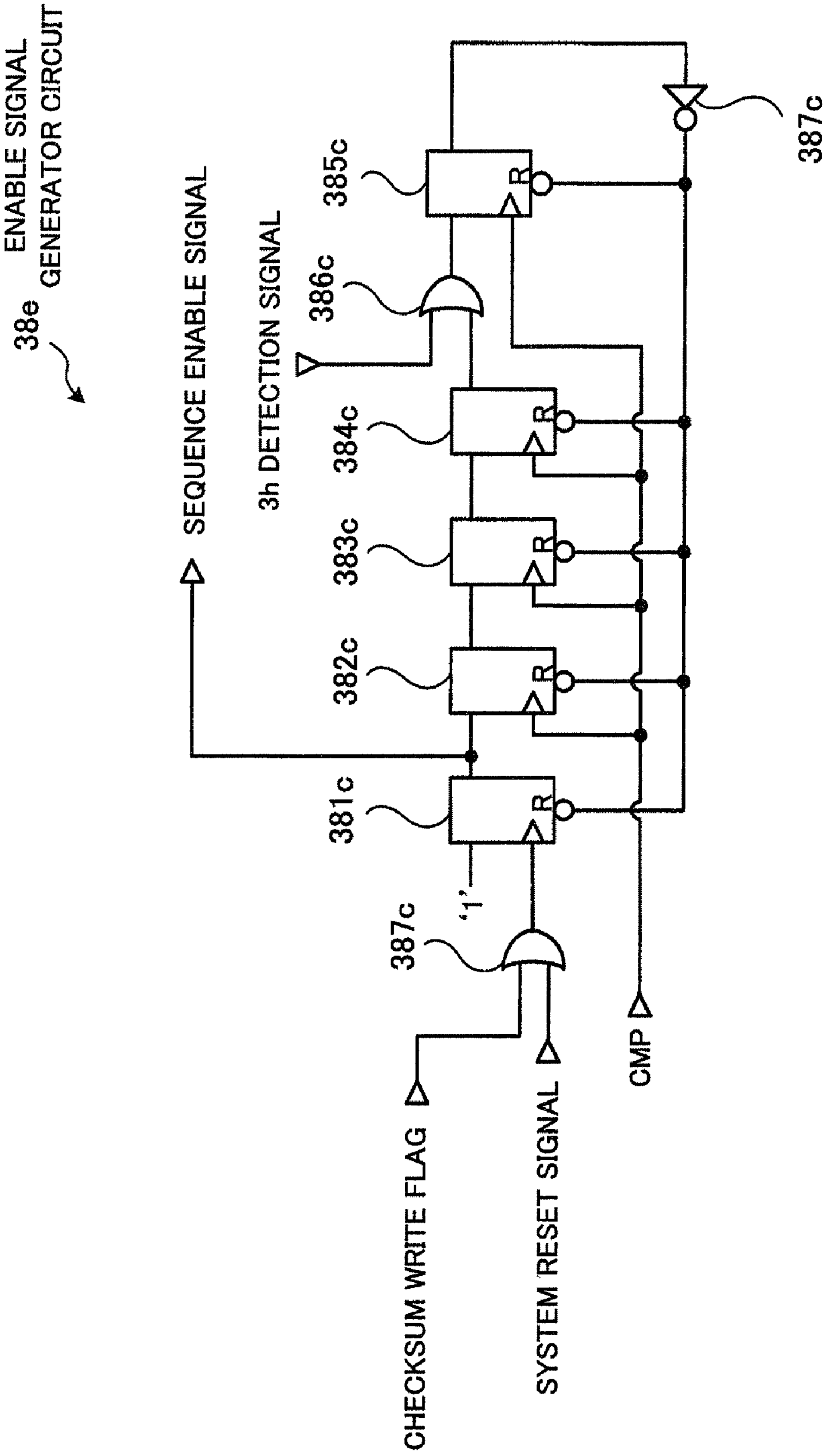
FIG. 28 is a circuit diagram of an enable signal generator circuit of the fourth embodiment.
Figure 29:
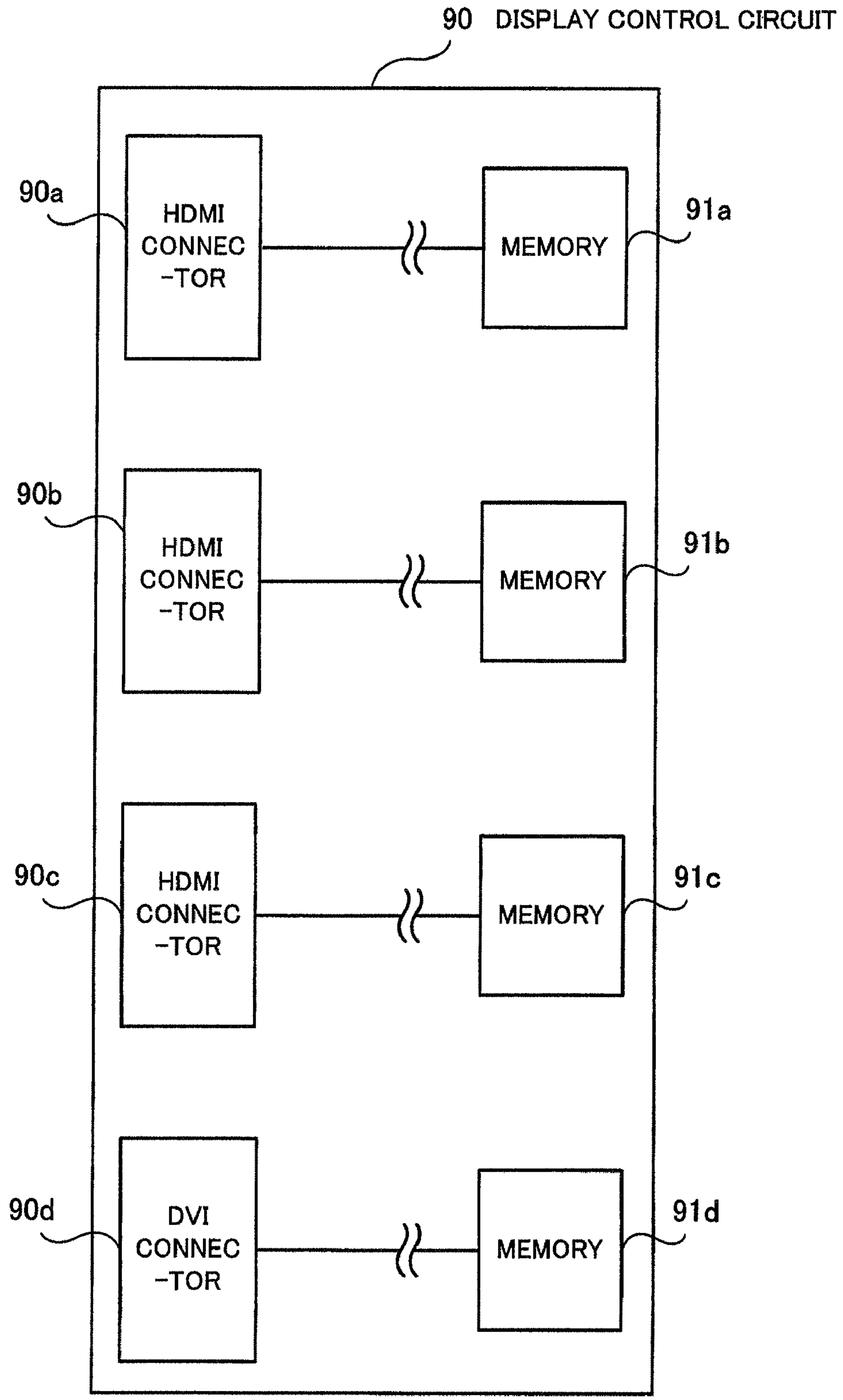
FIG. 29 PRIOR ART
FIG. 29 shows an exemplary configuration of a conventional display control circuit.

FIG. 28 is a circuit diagram of the enable signal generator circuit according to the fourth embodiment.

The enable signal generator circuit 38*e* has an OR gate 387*c* preceding the D-FF 381*c* and adapted to derive the OR of the system reset signal and the checksum write flag. Thus, when either of the system reset signal and the checksum write flag is "1", the enable signal generator circuit 38*e* outputs the sequence enable signal.

The display control circuit of the fourth embodiment provides the same advantageous effects as those achieved by the display control circuit of the third embodiment.

With the display control circuit of the fourth embodiment, moreover, where the pointer has been updated, for example, the data-change addresses are traced again at the time the checksum is written. This permits the data-change addresses to be updated without the need for the user to pay attention to the addresses (without the need for the user to specify new data-change addresses or to execute a sequence for updating).

In the data-change address updater circuit 38*d* of the fourth embodiment, the checksum write operation is utilized to trigger off the retracting of the data-change addresses, but the retracing may be triggered otherwise. For example, the data-change addresses may be retraced when the initial reset is terminated or when I2C slave addresses are found to coincide.

According to the present embodiment, the arbitration controller configured by hardware arbitrates access requests to avoid contention of access. The arbitration can therefore be performed using a simple configuration, without the need for a CPU or the like, making it possible to reduce the scale of circuitry as well as costs. Also, since multiple masters can be controlled with the use of a single memory, the scale of circuitry as well as data write operations can be reduced.

The foregoing is considered as illustrative only of the principles of the present embodiment. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A display control circuit for exchanging, with a plurality of masters, attribute information defining conditions for displaying video on a display, the display control circuit comprising:

- a memory to store the attribute information;
- a plurality of channels to accept access requests to access the memory from the respective masters; and
- an arbitration controller to arbitrate the access requests accepted via the respective channels and permit a selected one of the access requests to access the memory, the arbitration controller including:
- an acceptor to asynchronously accept the access requests accepted via the channels;
- a plurality of latches to synchronize the access requests by using a first arbitration pulse input thereto in response to the access requests;
- an arbiter to perform arbitration in accordance with values latched by the respective latches; and
- a synchronizer to deterministically settle one of the access requests arbitrated by the arbiter, in response to a second arbitration pulse.

2. The display control circuit according to claim 1, wherein priorities of the access requests are determined by the channels via which the access requests are accepted, and the arbitration controller arbitrates the access requests in accordance with the priorities.

3. The display control circuit according to claim 1, wherein the arbitration controller further includes an arbitration pulse generator to generate the first arbitration pulse by delaying the access request, and generate the second arbitration pulse by delaying the first arbitration pulse.

4. The display control circuit according to claim 1, further comprising:

a comparator to determine whether or not a memory address corresponding to the access request coincides with an address requiring change of data stored therein; and a replacer to replace the data of a coincident address determined by the comparator, with replacement data and outputting resultant data.

5. The display control circuit according to claim 4, wherein the replacer has a memory to store the replacement data prepared for the respective masters and replaces the data of the coincident address with suitable one of the replacement data.

6. The display control circuit according to claim 4, wherein the address requiring change of data has a chain structure addressable by a pointer including code number and byte length, and wherein the comparator traces the chain to identify the address requiring change of data and holds the identified address.

7. The display control circuit according to claim 6, further comprising a decision unit to determine whether or not data has been written in an address of the memory holding a checksum, wherein the chain is traced again as soon as the decision unit makes a decision.

8. A display device for exchanging, with a plurality of masters, attribute information defining conditions for displaying video on a display, the display device comprising:

a display control circuit including a memory to store the attribute information, a plurality of channels to accept access requests to access the memory from the respective masters, and an arbitration controller to arbitrate the access requests accepted via the respective channels and permit a selected one of the access requests to access the memory, wherein the arbitration controller includes:

an acceptor to asynchronously accept the access requests accepted via the channels;

a plurality of latches to synchronize the access requests by using a first arbitration pulse input thereto in response to the access requests;

an arbiter to perform arbitration in accordance with values latched by the respective latches; and a synchronizer to deterministically settle one of the access requests arbitrated by the arbiter, in response to a second arbitration pulse.

9. A display control circuit for exchanging, with a plurality of masters, attribute information defining conditions for displaying video on a display, the display control circuit comprising:

a memory to store the attribute information;

a plurality of channels with different priorities to accept a plurality of access requests to access the memory from the respective masters; and a plurality of arbiter circuits, respectively coupled to the channels, to arbitrate among the access requests accepted by the channels and permit one of the access requests to access the memory, the arbiter circuits each comprising:

a first flip-flop to asynchronously accept the access request of the respective channel, a delay circuit to produce a delayed signal by delaying the access request accepted by the first flip-flop, a second flip-flop to produce a permission signal that permits the access request of the respective channel to access the memory, and a channel arbitration circuit to cause the second flip-flop to produce the permission signal in response to the delayed signal, when none of other arbiter circuits coupled to the channels with higher priorities have accepted the access requests, and when none of other arbiter circuits coupled to the channels with lower priorities are permitting access to the memory.

* * * * *